(12) United States Patent
Ishibashi et al.

(10) Patent No.: US 11,435,507 B2
(45) Date of Patent: Sep. 6, 2022

(54) OPTICAL ELEMENT, OPTICAL SYSTEM, AND IMAGING APPARATUS

(71) Applicant: CANON KABUSHIKI KAISHA, Tokyo (JP)

(72) Inventors: Tomohiko Ishibashi, Utsunomiya (JP); Kazue Uchida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 338 days.

(21) Appl. No.: 16/778,335

(22) Filed: Jan. 31, 2020

(65) Prior Publication Data

US 2020/0257026 A1 Aug. 13, 2020

(30) Foreign Application Priority Data

Feb. 12, 2019 (JP) .............................. JP2019-022449
Feb. 14, 2019 (JP) .............................. JP2019-024138

(51) Int. Cl.
*G02B 5/20* (2006.01)
*G02B 1/11* (2015.01)

(52) U.S. Cl.
CPC ................ *G02B 5/205* (2013.01); *G02B 1/11* (2013.01)

(58) Field of Classification Search
CPC .. G02B 1/04; G02B 1/11; G02B 1/113; G02B 1/115; G02B 1/116; G02B 1/118; G02B 5/22; G02B 5/24; G02B 5/205; G02B 5/223; G02B 5/287; G02B 5/3041; G03B 9/00; G03B 9/02
See application file for complete search history.

(56) References Cited

U.S. PATENT DOCUMENTS

| | | | |
|---|---|---|---|
| 5,715,103 A * | 2/1998 | Amano | G02B 5/205 359/888 |
| 10,067,322 B2 | 9/2018 | Ishibashi | |
| 2006/0061867 A1* | 3/2006 | Kunii | G02B 5/205 359/601 |
| 2006/0110587 A1* | 5/2006 | Okami | G02B 5/205 428/457 |
| 2007/0178315 A1* | 8/2007 | Thomas | G02C 7/108 428/432 |
| 2017/0285230 A1* | 10/2017 | Koga | G02B 5/22 |
| 2019/0107650 A1 | 4/2019 | Uchida | |
| 2020/0150534 A1 | 5/2020 | Uchida | |

FOREIGN PATENT DOCUMENTS

| | | |
|---|---|---|
| JP | 2007178822 A | 7/2007 |
| JP | 2017040909 A | 2/2017 |

* cited by examiner

*Primary Examiner* — Sultan Chowdhury
(74) *Attorney, Agent, or Firm* — Carter, DeLuca & Farrell LLP

(57) ABSTRACT

An optical element having an area in which a transmittance changes in a first direction, the optical element includes a substrate and a first layer in a second direction orthogonal to the first direction. A thickness of the first layer in the second direction changes in the first direction, and the extinction coefficient of the first layer changes in the first direction. A predetermined conditional expression is satisfied.

19 Claims, 26 Drawing Sheets

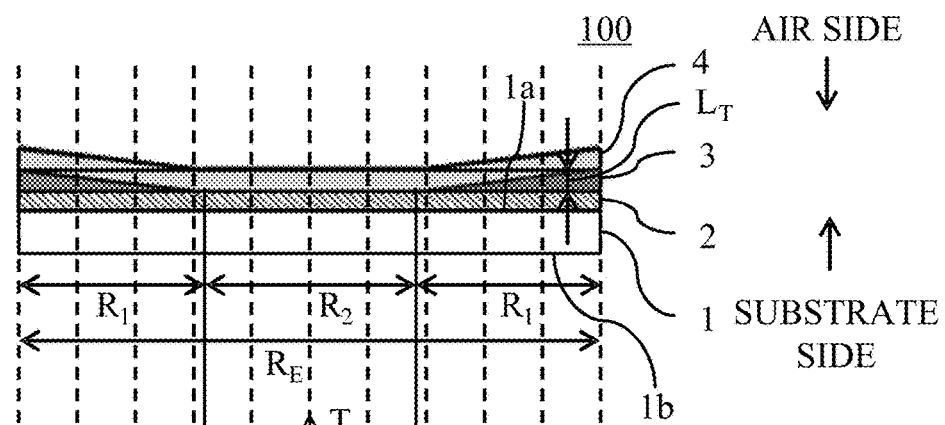
FIG. 1A
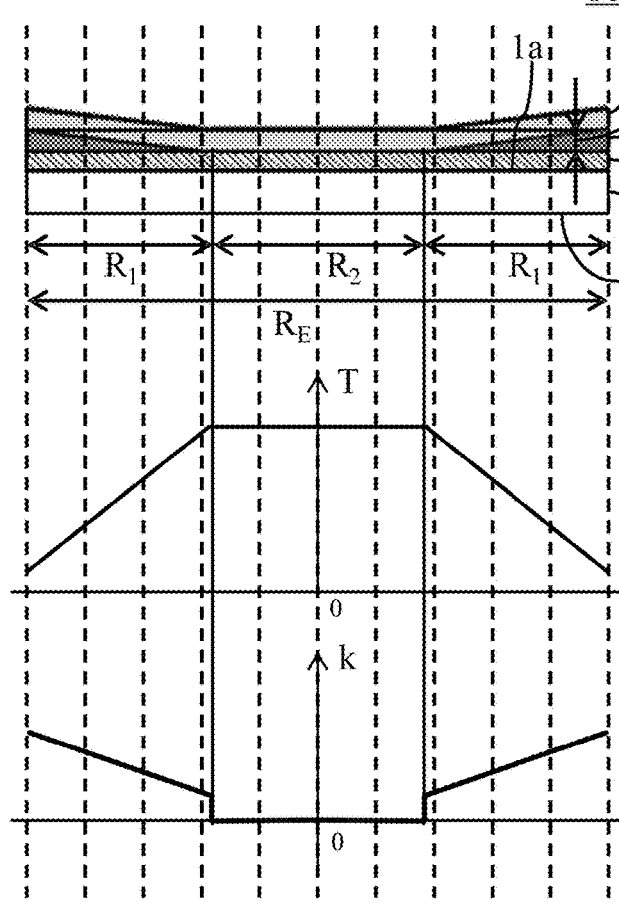
FIG. 1B
FIG. 1C

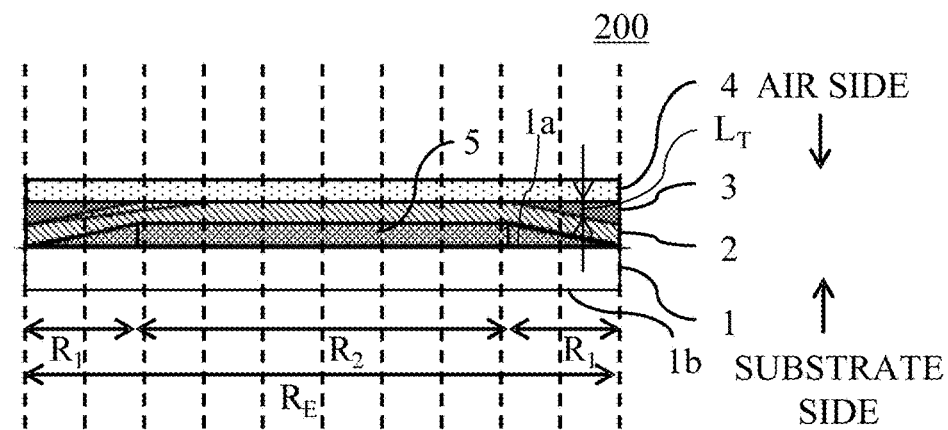
FIG. 4A
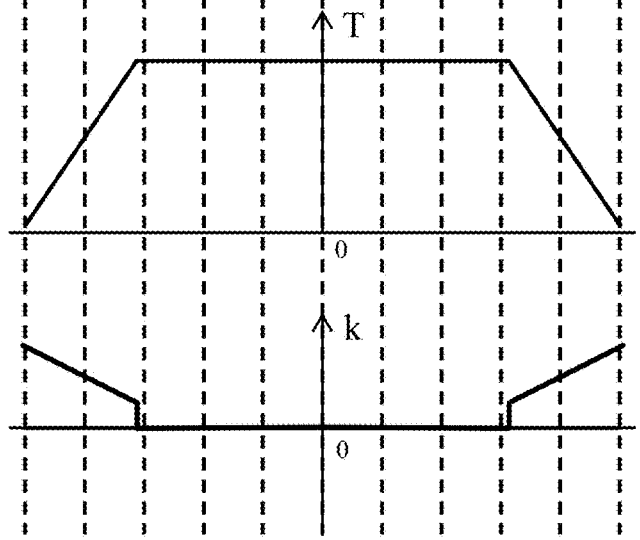
FIG. 4B
FIG. 4C

OPTICAL ELEMENT, OPTICAL SYSTEM, AND IMAGING APPARATUS

BACKGROUND OF THE INVENTION

Field of the Invention

The present invention relates to an optical filter.

Description of the Related Art

An ND (Neutral Density) filter that adjusts a transmission light amount may be used for an optical filter in an imaging apparatus. In particular, a gradation type ND filter having a gradually different transmittance for each area on the optical plane is used to arbitrarily control the brightness of the image or to improve sharpness scattering of an outline of an out-of-focus image (blurred image) (and the consequent image degradation).

Japanese Patent Laid-Open No. ("JP") 2017-40909 discloses a film configuration configured to reduce the reflectance regardless of the incident direction for the gradation type ND filter having a different film thickness with an absorption characteristic for each area.

The ND filter disclosed in JP 2017-40909 has a uniform extinction coefficient of the film having the absorption characteristic. It is thus difficult to easily create an ND filter having high antireflection performances for areas having different transmittances.

JP 2007-178822 discloses a gradation type ND filter that controls the transmittance and reflectance by properly setting a thickness of a laminated film for each area.

However, the reduction of the reflectance in the ND filter disclosed in JP 2007-178822 is not enough to obtain a high-quality image with reduced ghosts and flares.

A type of ND filter that absorbs unnecessary light may show different reflectances for incident light from the surface side and for incident light from the substrate side. However, JP 2007-178822 is silent about the reflectance for the incident light from the substrate side.

SUMMARY OF THE INVENTION

The present invention provides an optical element, an optical system, and an imaging apparatus, each of which is easy to manufacture and has high antireflection performance for areas having different transmittances.

An optical element having an area in which a transmittance changes in a first direction includes a substrate and a first layer in a second direction orthogonal to the first direction. A thickness of the first layer in the second direction changes in the first direction, and the extinction coefficient of the first layer changes in the first direction. The following conditional expression is satisfied:

$$0.005 \leq k_{max} \leq 2.0$$

where kmax is a maximum value of the extinction coefficient for light with a wavelength of 550 nm.

An optical system and an imaging apparatus having the above optical element also constitute another aspect of the present invention.

Further features of the present invention will become apparent from the following description of exemplary embodiments with reference to the attached drawings.

BRIEF DESCRIPTION OF THE DRAWINGS

FIGS. 1A to 1C are schematic views of an optical filter according to Example 1.

FIGS. 4A to 4C are schematic views of an optical filter according to Example 2.

DESCRIPTION OF THE EMBODIMENTS

Figure 2:
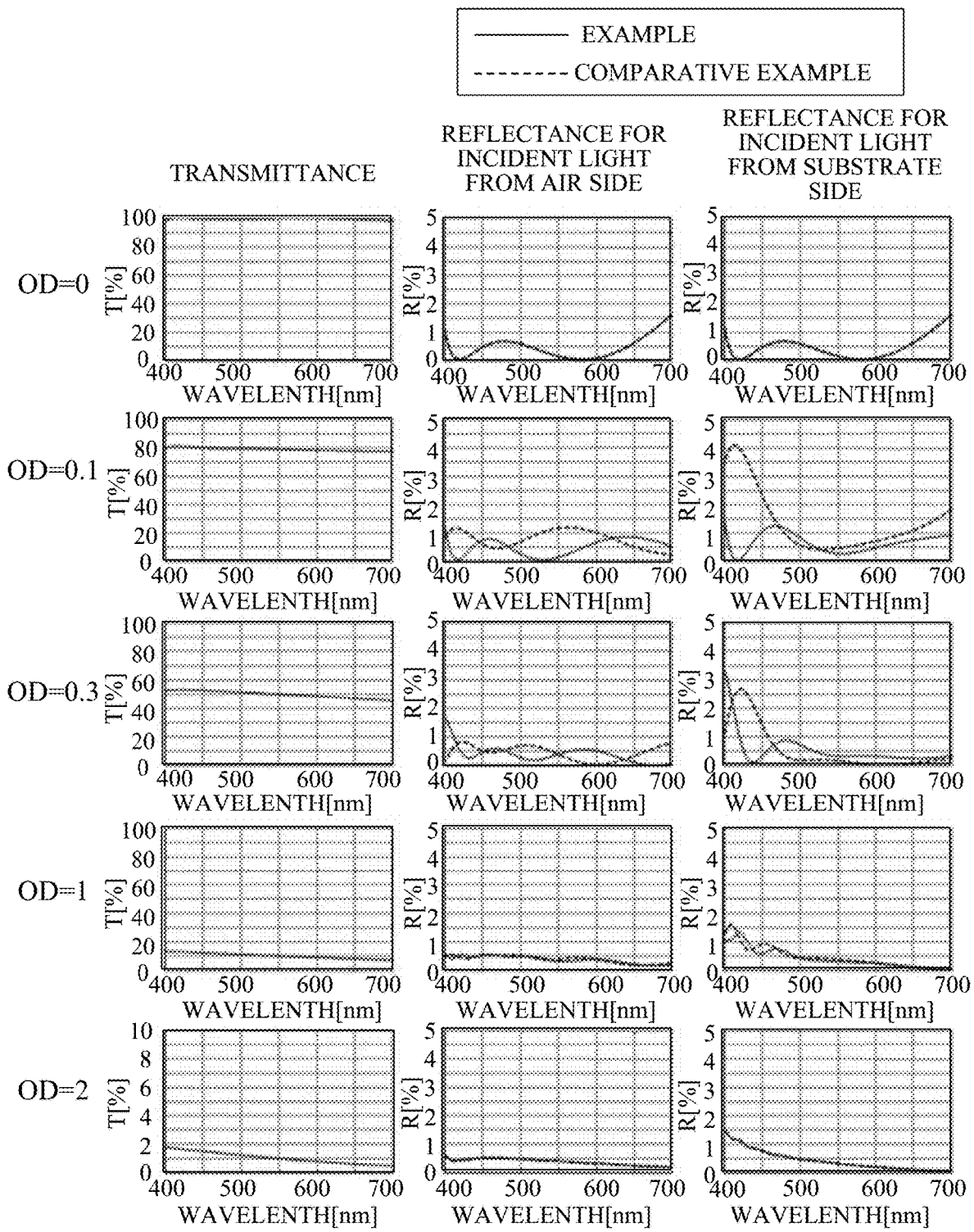
FIG. 2 illustrates spectral transmittances and spectral reflectances of the optical filter according to Example 1.

Referring now to the accompanying drawings, a detailed description will be given of embodiments according to the present invention. Corresponding elements in respective figures will be designated by the same reference numerals, and a duplicate description thereof will be omitted.

Referring now to FIGS. 1A, 1B, and 1C, a description will be given of a structure of an optical filter (optical element) according to one embodiment (Example 1) of the present invention. FIG. 1A is a schematic view (sectional view) of an optical filter (optical element) 100 according to this embodiment. The optical filter 100 includes a substrate (base plate) 1, an intermediate antireflection layer (intermediate layer) 2, an absorption layer (first layer) 3, and a surface antireflection layer (second layer) 4. That is, the optical filter 100 includes in order the intermediate antireflection layer 2, the absorption layer 3, and the surface antireflection layer 4 on the surface 1a (first surface) of the substrate 1. A surface 1b (second surface) opposite to the surface 1a of the substrate 1 in the optical filter 100 may be provided with the above laminated structure similar to the surface 1a, or an antireflection film as necessary (not shown). Herein, each of the intermediate antireflection layer 2 and the surface antireflection layer 4 includes a film having one or more layers. The number of stacked layers in each antireflection layer (such as the intermediate antireflection layer 2 and surface antireflection layer 4) may be increased in order to adjust the refractive index, to expand the antireflection band, to reduce the incident angle dependency, or to reduce the polarization dependency. In order to improve the antireflection performance in the optical filter, the intermediate antireflection layer (intermediate layer) 2 and the surface antireflection layer (second layer) may be configured as described in Examples 5 to 10.

As illustrated in FIG. 1A, the thickness LT (thickness in the vertical direction (second direction) in FIG. 1A) of the absorption layer 3 continuously changes in an area R1 (area in the in-plane direction (lateral direction (first direction) in FIG. 1A)) where the transmittance of the optical filter 100 continuously changes. The absorption layer 3 is not formed in an area $R_2$ in which the transmittance is constant. That is, the optical filter 100 has the first area (area R1) in which the transmittance changes and the second area (area R2) in which the transmittance is constant, and the absorption layer 3 is formed in the first area and is not formed in the second area.

On the other hand, in the entire area $R_E$ of the optical filter 100, each of the intermediate antireflection layer 2 and the surface antireflection layer 4 has a film having an approximately uniform (uniform or substantially uniform) thickness. The film having the approximately uniform thickness includes a film having a changing thickness due to the fine unevenness depending on the particle size of the laminated material and the density of the laminated layers, and a film having a changing thickness unintentionally formed by a rotation radius difference between the central portion and the end portion on the same substrate on the basis of the film formation rotation axis.

FIG. 1B illustrates a transmittance distribution in each area of the optical filter 100, where the ordinate axis denotes a transmittance T and the abscissa axis indicates an area (position in the in-plane direction) of the optical filter 100. The optical filter 100 is configured such that the transmittance T changes according to the thickness of the absorption layer 3, and realizes a gradation type ND filter that continuously changes the thickness of the absorption layer 3. As illustrated in FIG. 1B, the transmittance T decreases as the absorption layer 3 becomes thicker.

FIG. 1C illustrates an extinction coefficient distribution of the absorption layer 3, where the ordinate axis represents an extinction coefficient k at a wavelength of 550 nm, and the abscissa axis represents an area (position in the in-plane direction) of the optical filter 100. In the area $R_2$ where no absorption layer 3 is formed, the extinction coefficient is 0, and in the area $R_1$ where the transmittance continuously changes, the transmittance decreases or the extinction coefficient increases as the thickness LT of the absorption layer 3 increases. The extinction coefficient at the boundary between the areas $R_1$ and $R_2$ is 0.05, which is the minimum value in the absorption layer 3. In the area $R_1$, the extinction coefficient of the absorption layer 3 increases as the position becomes more distant from the area $R_2$, and the extinction coefficient reaches a maximum value of 0.218 at a position where the thickness LT of the absorption layer 3 is maximum.

Normally, in a gradation type ND filter (optical filter) in which the thickness of the absorption layer 3 changes as illustrated in FIG. 1A, the reflectance significantly varies depending on the change in the thickness of the absorption layer 3 and the extinction coefficient. Hence, it is difficult to reduce the reflectance in the entire area in the in-plane direction of the ND filter. On the other hand, the optical filter 100 according to this embodiment can reduce the reflectance in the in-plane direction in the entire area whether the light enters from the air side (surface antireflection layer 4 side) or from the substrate side (surface 1b side of the substrate 1).

FIG. 2 illustrates the spectral transmittance and the spectral reflectance when light vertically enters the optical filter 100 (during vertical incidence). Hereinafter, the spectral transmittance and the spectral reflectance described in this specification will be characteristics during the vertical incidence, respectively. FIG. 2 illustrates the spectral transmittances and the spectral reflectances of the areas where the optical density OD (Optical Density) due to the light absorption of the absorption layer 3 is 0, 0.1, 0.3, 1, and 2 for the light having the wavelength of 550 nm. In FIG. 2, the ordinate axis represents spectral transmittance (transmittance T (%)) or spectral reflectance (reflectance R (%)), and the abscissa axis represents the wavelength (nm). In FIG. 2, this embodiment is illustrated by a solid line. A comparative example is illustrated by a broken line in which the extinction coefficient of the absorption layer 3 is uniform with a value at the lowest position of the transmittance. The optical density OD is a value defined by the following conditional expression (1) using the transmittance T ($0 \leq T \leq 1$).

$$OD = \log_{10}(1/T) \quad (1)$$

The area where the optical density OD=0 is an area in which the absorption layer 3 has a thickness of 0. A reflectance Rair for the incident light from the air side (surface side) and the reflectance Rsub for the incident light from the substrate side are equal to each other. On the other hand, in the area in which the optical density OD is not 0 (OD=0.1, 0.3, 1, 2) or the area in which the thickness of the absorption layer 3 is not 0, the reflectance Rair for the incident light from the air side and the reflectance Rsub for the incident light from the substrate side are different from each other. This is because the Fresnel coefficient at each interface differs depending on the incident direction when there is the absorption layer 3.

A transmission light intensity P at a wavelength λ, passing through a medium having an absorption characteristics is expressed by the following conditional expression (2) where P0 is an incident light intensity, t is a thickness of the medium, and k is an extinction coefficient.

$$P = P_0 \times \exp(-4\pi k t)/\lambda \tag{2}$$

In order to reduce the reflectance changes on the air side and on the substrate side due to the difference in optical density OD, the extinction coefficient of the absorption layer 3 may be made smaller. However, as understood from the conditional expression (2), it is necessary to increase the film thickness of the absorption layer in order to obtain an equivalent dimming effect. When the absorption layer 3 is formed by the vacuum vapor deposition, the film formation time needs to be extended to increase the film thickness and the productivity is lowered. Moreover, since the stress inside the film becomes larger as the absorption layer 3 becomes thicker, the film may be cracked by high and low temperature environments or a temperature shock and the environmental resistance falls.

Figure 3:
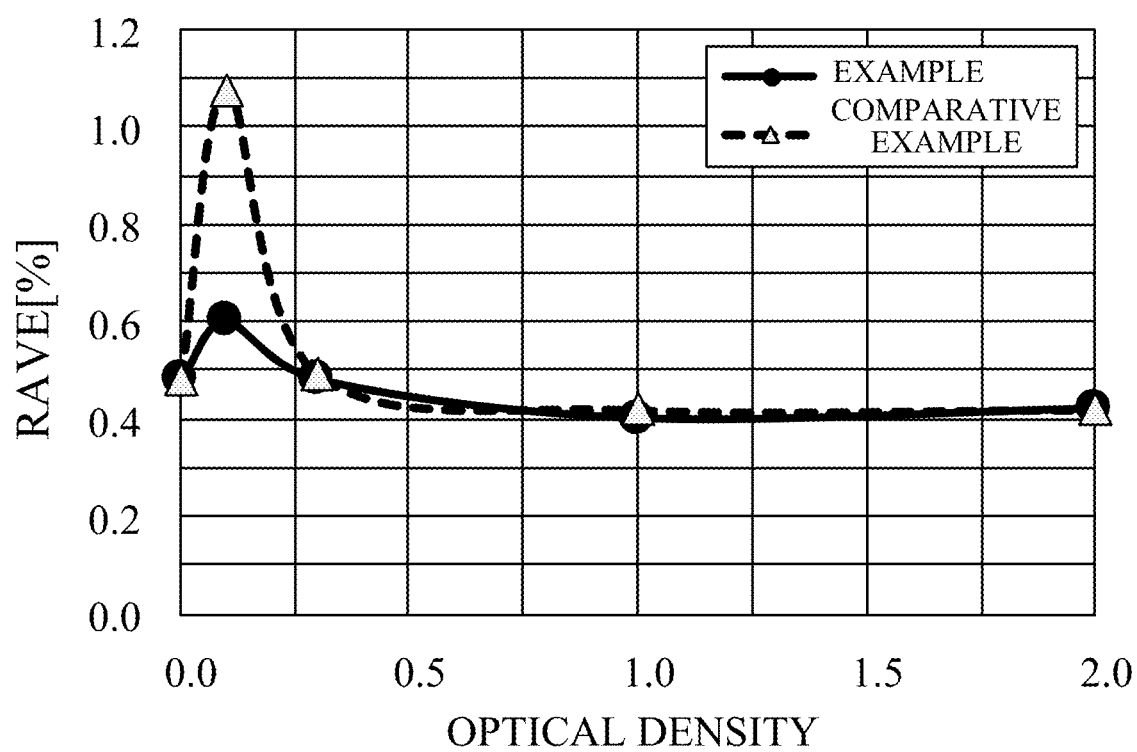
FIG. 3 illustrates a relationship between an optical density and an average reflectance according to Example 1.

In this embodiment, in order to reduce the reflectance without increasing the film thickness, as illustrated in FIG. 1C, the extinction coefficient increases as the thickness LT of the absorption layer 3 increases, and the optical density OD has a maximum value of 2. Thereby, the extinction coefficient is relatively higher at the position where the transmittance is minimum or the film thickness of the absorption layer 3 is maximum, and the reflectance is reduced by making relatively lower the extinction coefficient of the area where the film thickness of the absorption layer 3 changes without increasing the film thickness. FIG. 3 illustrates an average reflectance Rave at each optical density OD where Rave is an average value of the reflectance for the incident light from the air side and the reflectance for the incident light from the substrate side in the wavelength range of 400 nm to 700 nm. It is understood that the average reflectance Rave of this embodiment is smaller than that of the comparative example in an area with a small optical density.

In forming a material that exhibits an absorption characteristic by the vacuum deposition, the extinction coefficient of the thin film correlates with the heating temperatures of the deposition apparatus and the substrate, and the extinction coefficient tends to be higher as the temperature becomes higher. In order to change the extinction coefficient of the absorption layer 3 for each area as in this embodiment, for example, a heat source may be installed such that the substrate temperature is not uniform but varies depending on the area. For example, the heat source may be installed only near an area where the extinction coefficient is desired to be high, or a plurality of heat sources may be installed to change each set temperature. A cooling device may be installed to partially lower the temperature. The shape of the substrate 1 and the heat source may be changed relatively. For example, if the heat sources are arranged on a curved surface for the planar substrate 1, the temperature distribution may be formed in areas near and far from the substrate 1. Alternatively, the substrate 1 having a curved shape may be used, the surface of the substrate 1 opposite to the absorption layer 3 may be concave, and the temperature distribution may be formed with a substantially flat heat source. At this time, the substrate 1 may be meniscus or biconcave. In forming a concentric temperature distribution, the heat sources may be arranged in a circular shape, and the shape of the substrate 1 may be made concentric along the first direction.

In this embodiment, the maximum value kmax of the extinction coefficient of the absorption layer 3 satisfies the following conditional expression (3) in order to reduce the reflectance change due to the difference in optical density OD.

$$0.005 \leq k\mathrm{max} \leq 2.0 \tag{3}$$

Thereby, for example, when the light is incident from the air side and the extinction coefficient is changed according to the change in the film thickness of the absorption layer 3, a simple configuration in which the surface antireflection layer 4 having a uniform thickness is merely provided to the top of the absorption layer 3 can provide a low reflectance regardless of the optical density (the thickness of the absorption layer 3). Similarly, when the light is incident from the substrate side, a simple configuration in which the intermediate antireflection layer 2 having a uniform thickness is provided to the bottom of the absorption layer 3 can provide a low reflectance regardless of the optical density. Therefore, a simple configuration like the optical filter 100 according to this embodiment can provide excellent antireflection performance that does not depend on the incident direction of light. When the value is lower than the lower limit of the conditional expression (3), there is few difference between the reflectance Rair for the incident light from the air side and the reflectance Rsub for the incident light from the substrate side, and the configuration of the present invention cannot provide satisfactory effects. In addition, in order to obtain a sufficient dimming effect, the film thickness of the absorption layer becomes thicker, so that the film formation becomes difficult, the environmental resistance decreases, the optical path length difference caused by the difference in thickness of the absorption layer increases, and the imaging performance degrades. If the value is higher than the upper limit of the conditional expression (3), the reflectance increases in the area where the extinction coefficient is maximum, and the ghosts and flares occur during imaging.

The conditional expression (3) may be replaced with each of the following conditional expressions (3a) to (3g) in this order.

$$0.02 \leq k\mathrm{max} \leq 1.50 \tag{3a}$$

$$0.06 \leq k\mathrm{max} \leq 1.00 \tag{3b}$$

$$0.10 \leq k\mathrm{max} \leq 0.80 \tag{3c}$$

$$0.12 \leq k\mathrm{max} \leq 0.60 \tag{3d}$$

$$0.14 \leq k\mathrm{max} \leq 0.40 \tag{3e}$$

$$0.14 \leq k\mathrm{max} \leq 0.30 \tag{3f}$$

$$0.14 \leq k\mathrm{max} \leq 0.25 \tag{3g}$$

By appropriately determining the minimum value kmin of the extinction coefficient of the absorption layer 3, the reflectance for the incident light from the air side and the reflectance for the incident light from the substrate side can be made smaller. Therefore, the optical filter according to each example satisfies the following conditional expression (4).

$$k\mathrm{min}/k\mathrm{max} \leq 0.95 \tag{4}$$

The conditional expression (4) relates to the extinction coefficient of the absorption layer 3. If the value is higher than the upper limit of the conditional expression (4), the change amount in the extinction coefficient of the absorption layer 3 in each area is too small to obtain the effect of reducing the reflectance in comparison with the uniform extinction coefficient regardless of the area. If the value on the left side of the conditional expression (4) becomes too small, it is necessary to provide a large temperature distribution, for example, when the absorption layer 3 is formed, which complicates the apparatus configuration or makes it difficult to control the temperature distribution. Thus, the conditional expression (4) may be replaced with each of the following conditional expressions (4a) to (4e) in this order.

$$0.01 \leq k\text{min}/k\text{max} \leq 0.80 \quad (4a)$$

$$0.02 \leq k\text{min}/k\text{max} \leq 0.60 \quad (4b)$$

$$0.05 \leq k\text{min}/k\text{max} \leq 0.50 \quad (4c)$$

$$0.10 \leq k\text{min}/k\text{max} \leq 0.40 \quad (4d)$$

$$0.15 \leq k\text{min}/k\text{max} \leq 0.30 \quad (4e)$$

The reflectance for the incident light from the air side and the reflectance for the incident light from the substrate side can be made smaller by an area where the extinction coefficient of the absorption layer increases as the thickness of the absorption layer 3 increases. The smaller the extinction coefficient is, the lower the reflectance tends to be, but in an area with a low transmittance, unless the extinction coefficient is made relatively higher, the absorption layer may become disadvantageously thicker. Hence, the extinction coefficient may be made lower in the area where the absorption layer 3 is relatively thinner, and may be higher in the area where thickness is relatively thicker.

The reflectance for the incident light from the air side and the reflectance for the incident light from the substrate side can be made smaller by properly determining a relationship between the wavelength $\lambda$, of light and the optical path length difference OPD1 of the absorption layer 3 between the thinning position and the thickest position of the thickness of the absorption layer 3. Therefore, the optical filter of each example may satisfy the following conditional expression (5) for the light having the wavelength of 550 nm.

$$0.1 \leq |OPD1/\lambda| \leq 10 \quad (5)$$

The conditional expression (5) relates to the optical path length difference caused by the thickness change of the absorption layer. The optical path length difference OPD1 is obtained by multiplying the difference between the maximum thickness and the minimum thickness of the absorption layer by the refractive index. As the optical path length difference caused by the absorption layer increases, the transmittance decreases, so that the influence on the imaging performance is less than that of the transparent medium. If the value is higher than the upper limit of the conditional expression (5), the optical path length difference becomes too large, a variety of aberrations increase, and the imaging performance deteriorates. On the other hand, if the value is lower than the lower limit of the conditional expression (5), it is necessary to increase the extinction coefficient of the absorption layer in order to obtain a sufficient gradation effect, so it is difficult to reduce the reflectance for the incident light from the air side and the reflectance for the incident light from the substrate side.

The conditional expression (5) may be replaced with each of the following conditional expressions (5a) to (5f) in this order.

$$0.2 \leq |OPD1/\lambda| \leq 8 \quad (5a)$$

$$0.4 \leq |OPD1/\lambda| \leq 7 \quad (5b)$$

$$0.5 \leq |OPD1/\lambda| \leq 6 \quad (5d)$$

$$1.2 \leq |OPD1/\lambda| \leq 5 \quad (5e)$$

$$2.5 \leq |OPD1/\lambda| \leq 4.5 \quad (5f)$$

In FIG. 1A, the surface antireflection layer 4 is disposed on the side opposite to the substrate 1 with respect to the absorption layer 3, and serves to reduce the reflectance for the incident light from the air side. The absence of the surface antireflection layer 4 may disadvantageously cause a high reflection at the interface between the absorption layer 3 and air.

By properly determining the maximum value ODmax of the optical density due to the light absorption in the absorption layer, the film thickness dOD of the absorption layer when the optical density becomes 0.1, and the film thickness dmax of the absorption layer when the optical density becomes maximum, the reflectance for the incident light from the air side and the reflectance for the incident light from the substrate side can be made smaller. The optical filter according to each embodiment may satisfy the following conditional expressions (6) and (7).

$$0.3 < OD\text{max} \leq 8 \quad (6)$$

$$0.02 \leq |dOD/d\text{max}| \leq 0.8 \quad (7)$$

The conditional expression (6) relates to the optical density due to the light absorption in the absorption layer. If the value is higher than the upper limit of the conditional expression (6), it is necessary to make the absorption layer thick and manufacturing becomes difficult. In addition, since it is necessary to increase the extinction coefficient, it is difficult to reduce the reflectance. On the other hand, if the value is lower than the lower limit of the conditional expression (6), the gradation effect by the absorption layer becomes smaller, and the reflectance reduction effect cannot be sufficiently obtained in comparison with the uniform extinction coefficient regardless of the area.

The conditional expression (7) relates to the thickness of the absorption layer. If the value is higher than the upper limit of the conditional expression (7), the change in the imaging performance increases because the change in the film thickness in the area with an optical density of 0.1 or less becomes steep. On the other hand, if the value is lower than the lower limit of the conditional expression (7), the change amount in the extinction coefficient becomes larger in the area where the optical density is 0.1 or less and manufacturing becomes difficult.

The conditional expression (6) may be replaced with each of the following conditional expressions (6a) to (6f) in this order. The conditional expression (7) may be replaced with each of the following conditional expressions (7a) to (7f) in this order.

$$0.4 < OD\text{max} < 8 \quad (6a)$$

$$0.6 < OD\text{max} < 6 \quad (6b)$$

$$0.8 < OD\text{max} < 5 \quad (6c)$$

$$1.0 < OD\text{max} < 4 \quad (6d)$$

$$1.1 < OD\text{max} < 3 \quad (6e)$$

$$1.2 < OD\text{max} < 3 \quad (6f)$$

$$0.03 \leq |dOD/d\max| \leq 0.6 \quad (7a)$$

$$0.04 \leq |dOD/d\max| \leq 0.5 \quad (7b)$$

$$0.05 \leq |dOD/d\max| \leq 0.4 \quad (7c)$$

$$0.0523|dOD/d\max| \leq 0.3 \quad (7d)$$

$$0.06 \leq |dOD/d\max| \leq 0.2 \quad (7e)$$

$$0.06 \leq |dOD/d\max| \leq 0.15 \quad (7f)$$

By appropriately setting the maximum value Tmax and the minimum value Tmin of the transmittance due to the light absorption in the absorption layer 3, the reflectance for the incident light from the air side and the reflectance for the incident light from the substrate side can be made smaller. Therefore, the optical filter according to each example may satisfy the following conditional expression (8) for the light having the wavelength of 550 nm.

$$-8 \leq \mathrm{Log}(T\min/T\max) \leq -0.4 \quad (8)$$

The conditional expression (8) relates to the transmittance due to the light absorption in the absorption layer. If the value is higher than the upper limit of the conditional expression (8), the gradation effect by the absorption layer is smaller, and the reflectance reduction effect cannot be sufficiently obtained in comparison with the uniform extinction coefficient of the absorption layer regardless of the area. On the other hand, if the value is lower than the lower limit of the conditional expression (8), the difference between the maximum film thickness and the minimum film thickness of the absorption layer or kmax and kmin becomes too large and manufacturing becomes difficult.

The conditional expression (8) may be replaced with each of the following conditional expressions (8a) to (8c) in this order.

$$-6 \leq \mathrm{Log}(T\min/T\max) \leq -0.6 \quad (8a)$$

$$-5 \leq \mathrm{Log}(T\min/T\max) \leq -0.8 \quad (8b)$$

$$-4 \leq \mathrm{Log}(T\min/T\max) \leq -0.9 \quad (8c)$$

In the gradation type ND filter according to this embodiment, the absorption layer 3 is not substantially formed in an area where the transmittance is constant and maximum. Thereby, the difference between the maximum value and the minimum value of the transmittance can be increased, and a better gradation effect can be obtained.

This embodiment has an area in which the transmittance changes in the in-plane direction of the substrate, and the thickness of the absorption layer 3 in the thickness direction of the substrate orthogonal to the in-plane direction changes in the in-plane direction of the substrate. The transmittance distribution of the gradation type ND filter (optical filter) can use a variety of shapes. For example, a transmittance distribution can be formed in the concentric direction so that the transmittance increases or decreases from the center to the periphery.

The transmittance distribution center of the optical filter having a concentric transmittance distribution may be disposed on the optical axis of the imaging optical system because a gradation effect that is a rotation target can be obtained for the imaging surface. The transmittance may change in one direction. In addition, there are various transmittance distribution shapes depending on the applications, but this embodiment is applicable to any transmittance distribution shape.

The thickness of the absorption layer 3 may concentrically change in the first direction. The thickness of the absorption layer 3 may be a first thickness in an area (center area) in which the distance from the center of the absorption layer 3 in the first direction is a first distance, and the thickness of the absorption layer 3 may be a second thickness that is thicker than the first thickness in an area (peripheral area) in which the distance from the center of the absorption layer 3 is a second distance longer than the first distance.

The extinction coefficient may be a first extinction coefficient in the area where the thickness of the absorption layer 3 is a third thickness, and the extinction coefficient may be a second extinction coefficient higher than the first extinction coefficient in an area where the thickness of the first layer is a fourth thickness larger than the third thickness. However, this embodiment is not limited to this example. Depending on the required reflection characteristics, contrary to the above, the extinction coefficient may be the second extinction coefficient in the area of the third thickness, and may be the first extinction coefficient lower than the second extinction coefficient in the area of the fourth thickness larger than the third thickness.

The substrate 1 may be circular when viewed from the second direction. The extinction coefficient may be a third extinction coefficient in an area (center area) in which the distance from the center of the substrate 1 in the first direction is a third distance. The extinction coefficient may be a fourth extinction coefficient higher than the third extinction coefficient in an area (peripheral area) in which the distance from the center of the substrate 1 is a fourth distance longer than the first distance.

A specific description will be given of each optical filter of this embodiment described in each example.

Example 1

A description will now be given of an optical filter (optical element) 100 according to Example 1. FIG. 1A is a schematic diagram of the optical filter 100 according to this example. As illustrated in FIG. 1B, the optical filter 100 according to this example is a gradation type ND filter in which the transmittance gradually decreases from the center toward the periphery on the optical plane (in-plane direction).

Table 1 shows characteristics of each element of the optical filter 100.

TABLE 1

| Film Number | Refractive Index | Film Thickness [nm] | Extinction Coefficient | Note |
|---|---|---|---|---|
| air | 1.0000 | — | — | Air |
| 43 | 1.3816 | 97.9 | 0 | Surface |
| 42 | 2.2607 | 21.8 | 0 | Antireflection |
| 41 | 1.3816 | 12.7 | 0 | Layer 4 |
| 31 | 2.1915 | Variable | 0.05~0.218 | Absorption Layer 3 |
| 22 | 2.1174 | 11.1 | 0 | Intermediate |
| 21 | 2.0384 | 59.1 | 0 | Antireflection Layer 2 |
| sub | 1.7758 | — | — | Substrate 1 |

In Table 1, the refractive index and the extinction coefficient are those at a wavelength of 550 nm, respectively. The same will apply to the tables described later.

The optical filter 100 includes the intermediate antireflection layer 2, the absorption layer 3, and the surface antireflection layer 4 in this order from the substrate 1. The intermediate antireflection layer 2 includes two layers or films 21 and 22. The surface antireflection layer 4 includes three layers or films 41, 42, and 43. The absorption layer 3 includes one layer or a film 31, and uses oxygen deficient TiO$_2$ in this embodiment. The substrate 1 is made of S-LAH66 from Ohara Inc. As illustrated in FIG. 1C, the extinction coefficient of the absorption layer 3 at a wavelength of 550 nm increases from the center toward the periphery, has a minimum value of 0.0500 and a maximum value of 0.2180. In Example 1, the extinction coefficient of the absorption layer 3 changes in the in-plane direction (first direction), and is uniform in the direction orthogonal to the in-plane direction (second direction). However, when the extinction coefficient also changes in the direction orthogonal to the in-plane direction, the effect of the present invention can be obtained if the average value of the extinction coefficient in the direction orthogonal to the in-plane direction satisfies the above conditional expression. The maximum value ODmax of the optical density is 2.0 due to the light absorption in the absorption layer 3, and the reflectance in an area with a small optical density is reduced without increasing the maximum film thickness since the extinction coefficient has a maximum value at the position where the optical density is maximum.

FIG. 2 illustrates the spectral transmittances and the spectral reflectances (Rair: reflectance for the incident light from the air side, Rsub: reflectance for the incident light from the substrate side) of the optical filter 100. FIG. 2 illustrates the spectral transmittances and the spectral reflectances at positions where the optical density OD is 0, 0.1, 0.3, 1, and 2 for the light with the wavelength of 550 nm, respectively. The reflectance according to a comparative example is represented by a broken line, when the extinction coefficient of the absorption layer 3 is uniformly configured at a value of 0.2180 at a position where the optical density is maximum.

FIG. 3 illustrates the average reflectance Rave of the optical filter 100 at each optical density. In particular, it is understood that the average reflectance Rave according to this example is low in the area where the optical density is low.

Example 2

A description will now be given of an optical filter (optical element) 200 according to Example 2. As illustrated in FIG. 4A, the optical filter 200 is a gradation ND filter that includes a phase compensation layer 5, the intermediate antireflection layer 2, the absorption layer 3, and the surface antireflection layer 4 in this order from the substrate 1, and has a transmittance that decreases from the center toward the periphery. The film thickness of the phase compensation layer increases in the direction opposite to the direction in which the thickness of the absorption layer changes, and serves to compensate the optical path length due to the thickness change of the absorption layer.

Table 2 shows characteristics of each element of the optical filter 200.

TABLE 2

| Film Number | Refractive Index | Film Thickness [nm] | Extinction Coefficient | Note |
| --- | --- | --- | --- | --- |
| air | 1.0000 | — | — | Air |
| 43 | 1.3816 | 98.3 | 0 | Surface |

TABLE 2-continued

| Film Number | Refractive Index | Film Thickness [nm] | Extinction Coefficient | Note |
| --- | --- | --- | --- | --- |
| 42 | 2.2607 | 24.2 | 0 | Antireflection |
| 41 | 1.3816 | 12.0 | 0 | Layer 4 |
| 31 | 2.0295 | Variable | 0.2~1.2407 | Absorption Layer 3 |
| 22 | 2.1174 | 24.3 | 0 | Intermediate |
| 21 | 2.0384 | 46.1 | 0 | Antireflection Layer 2 |
| 51 | 1.7758 | Variable | 0 | Phase Compensation Layer 5 |
| sub | 1.7758 | — | — | Substrate 1 |

In this embodiment, the phase compensation layer 5 uses a material having substantially the same characteristic as that of the substrate 1, and does not substantially affect the reflection characteristic. The number of laminated layers of a film in each antireflection layer is the same as that in Example 1. In this embodiment, the absorption layer 3 is made of ITO. The substrate 1 is made of S-LAH66 manufactured by Ohara Inc. As illustrated in FIG. 4C, the extinction coefficient of the absorption layer 3 at the wavelength of 550 nm increases from the center toward the periphery in an area where the absorption layer is provided, and has a minimum value of 0.2000 and a maximum value of 1.2407. The maximum value ODmax of the optical density is 2.0 due to the light absorption in the absorption layer 3, and the extinction coefficient has the maximum value at the position where the optical density is maximum. Example 2 maintains a wide area having no absorption layer near the center, changes the extinction coefficient, and limits an area where the reflectance is high to part of the peripheral part even if the absorption layer is made of a material having a high extinction coefficient.

Figure 5:
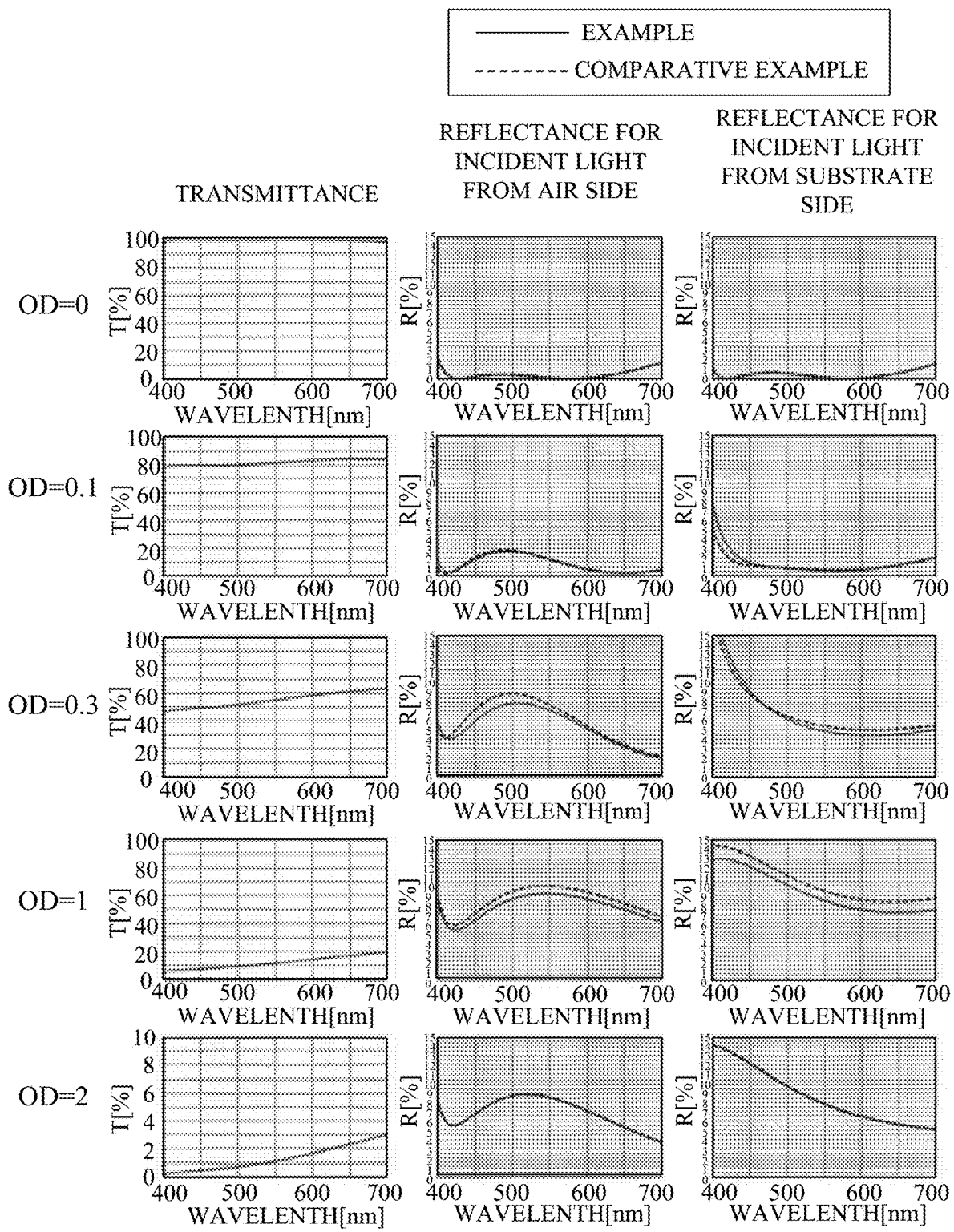
FIG. 5 illustrates spectral transmittances and spectral reflectances of the optical filter according to Example 2.

FIG. 5 illustrates the spectral transmittances and the spectral reflectances of the optical filter 200 for the incident light from the air side and the incident light from the substrate side. FIG. 5 illustrates the spectral transmittances and the spectral reflectances at positions where the optical density OD is 0, 0.1, 0.3, 1, and 2 for the light having the wavelength of 550 nm. The comparative example is illustrated in the same manner as in Example 1.

Figure 6:
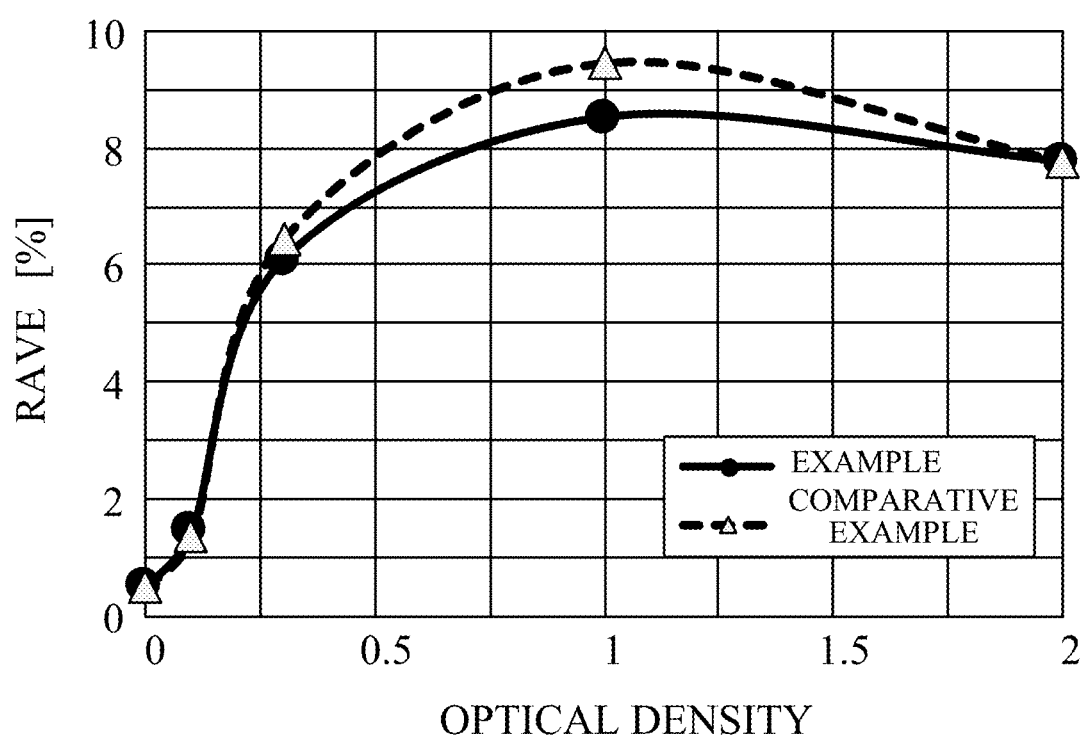
FIG. 6 illustrates a relationship between an optical density and an average reflectance according to Example 2.

FIG. 6 illustrates the average reflectance Rave of the optical filter 200 at each optical density. Similar to Example 1, since the conditional expressions (3), (4), and (5) are satisfied, the average reflectance Rave is low regardless of the optical density.

Example 3

Figure 7A:
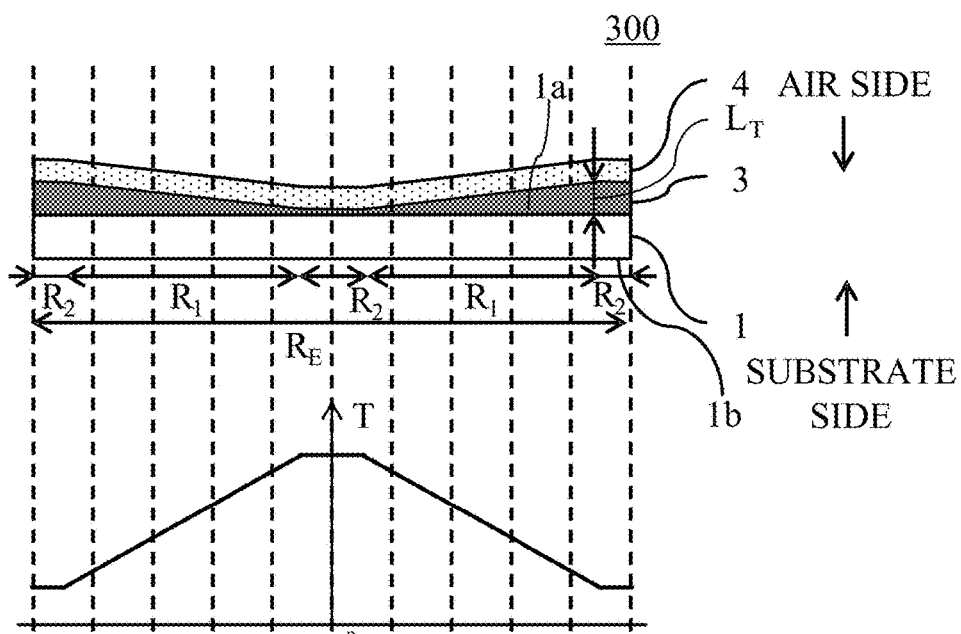
FIGS. 7A to 7C are schematic diagrams of an optical filter according to Example 3.
Figure 7B:
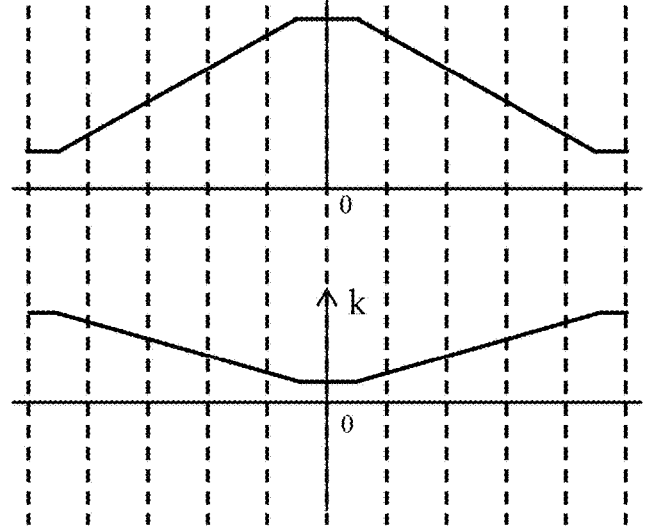

A description will now be given of an optical filter (optical element) 300 according to Example 3. As illustrated in FIG. 7A, the optical filter 300 is a gradation ND filter that includes the absorption layer 3 and the surface antireflection layer 4 in this order from the substrate 1, and the transmittance decreases from the center toward the periphery. The optical filter 300 has the area R2 with the constant thickness of the absorption layer 3 in the central area and the peripheral area. The optical filter 300 is different from the optical filters according to Examples 1 and 2 in having no intermediate antireflection layer 2.

Table 3 shows characteristics of each element of the optical filter 300.

TABLE 3

| Film Number | Refractive Index | Film Thickness [nm] | Extinction Coefficient | Note |
|---|---|---|---|---|
| air | 1.0000 | — | — | Air |
| 43 | 1.3894 | 98.3 | 0 | Surface |
| 42 | 2.1185 | 24.2 | 0 | Antireflection |
| 41 | 2.3546 | 12.0 | 0 | Layer 4 |
| 31 | 2.2042 | Variable | 0.1026~0.1947 | Absorption Layer 3 |
| sub | 2.0108 | — | — | Substrate 1 |

Figure 7C:
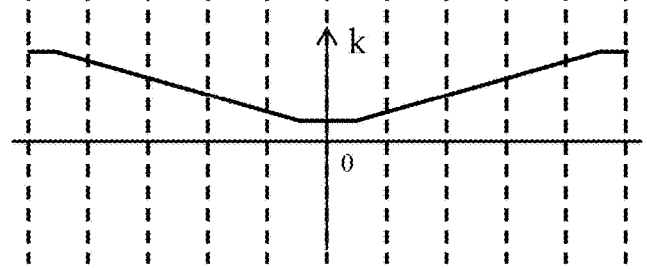

This example reduces the interface reflection between the substrate 1 and the absorption layer 3 by making the refractive index of the substrate 1 close to the refractive index of the absorption layer 3. The substrate 1 is made of S-LAH79 manufactured by Ohara Inc. As illustrated in FIG. 7C, the extinction coefficient at the wavelength of 550 nm increases from the center toward the periphery, and has the area R2 with the constant extinction coefficient in the peripheral part, and has a minimum value of 0.1026 and a maximum value of 0.1947. The maximum value ODmax of the optical density is 1.5 due to the light absorption in the absorption layer 3, and the reflectance is reduced in an area with a small optical density without increasing the maximum film thickness because the extinction coefficient is maximum at the position where the optical density is maximum.

Figure 8:
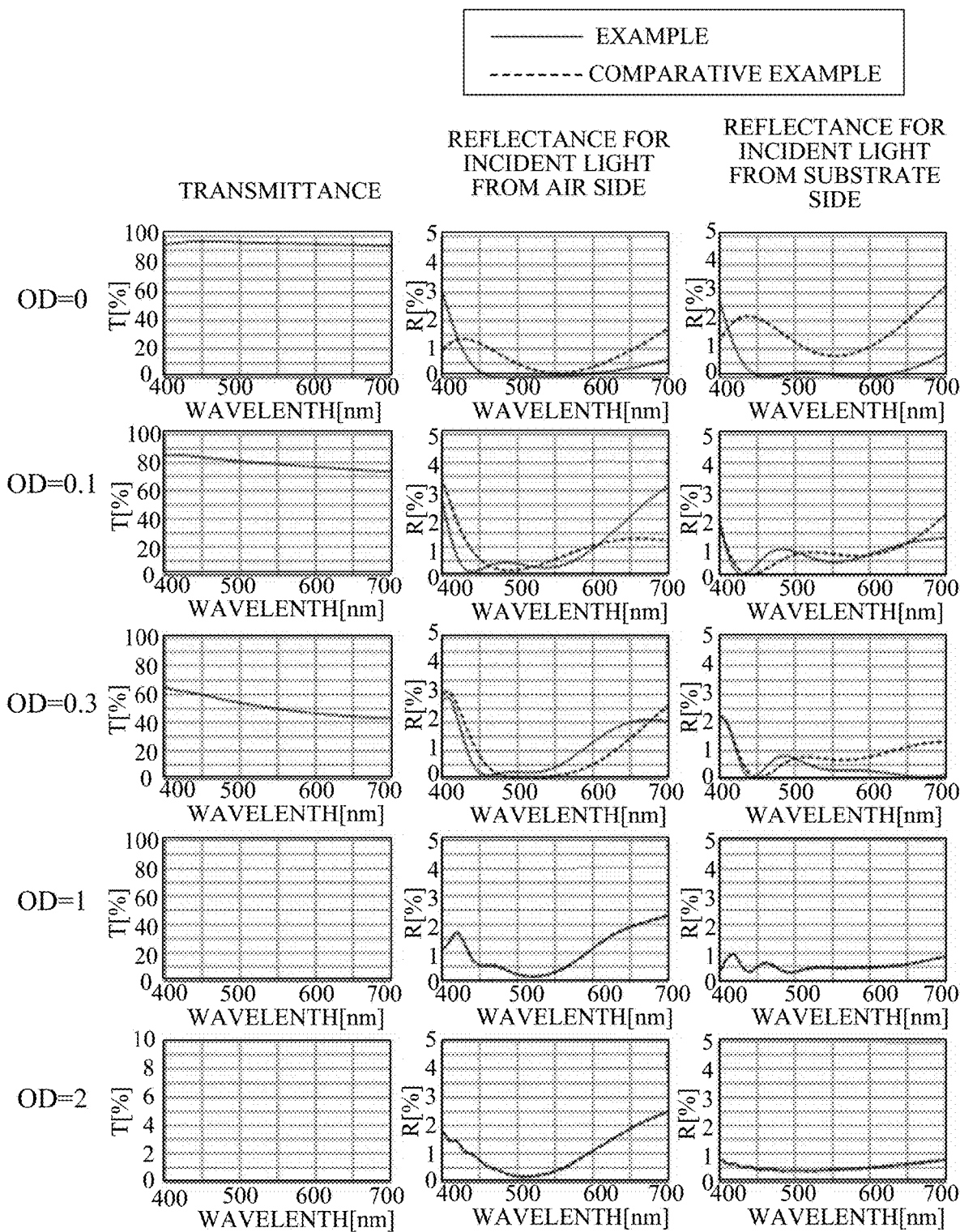
FIG. 8 illustrates spectral transmittances and spectral reflectances of the optical filter according to Example 3.

FIG. 8 illustrates the spectral transmittance and the spectral reflectance of the optical filter 300 for the incident light from the air side and the incident light from the substrate side. FIG. 8 illustrates the spectral transmittances and the spectral reflectances at positions where the optical density OD is 0, 0.1, 0.3, 1, 1.5 for the light having the wavelength of 550 nm. The comparative example is illustrated similar to Example 1.

Figure 9:
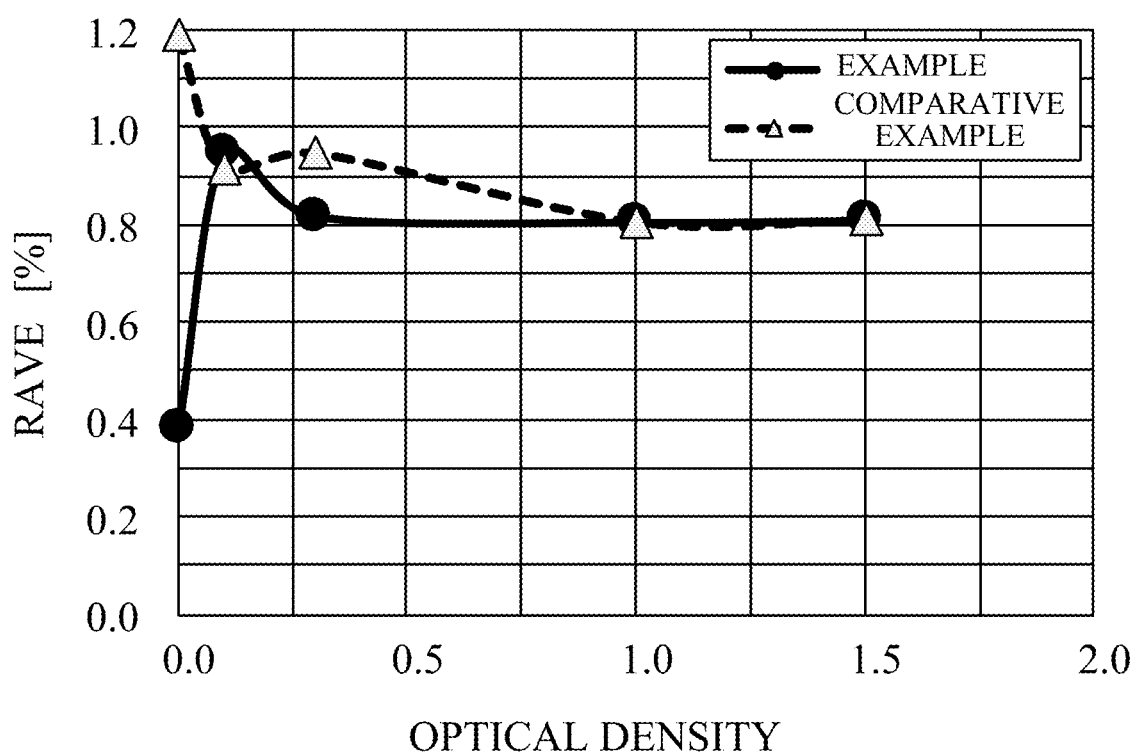
FIG. 9 illustrates a relationship between an optical density and an average reflectance according to Example 3.

FIG. 9 illustrates the average reflectance Rave of the optical filter 300 at each optical density. Similar to Examples 1 and 2, since the conditional expressions (3), (4), and (5) are satisfied, the average reflectance Rave is low regardless of the optical density.

Example 4

Figure 10A:
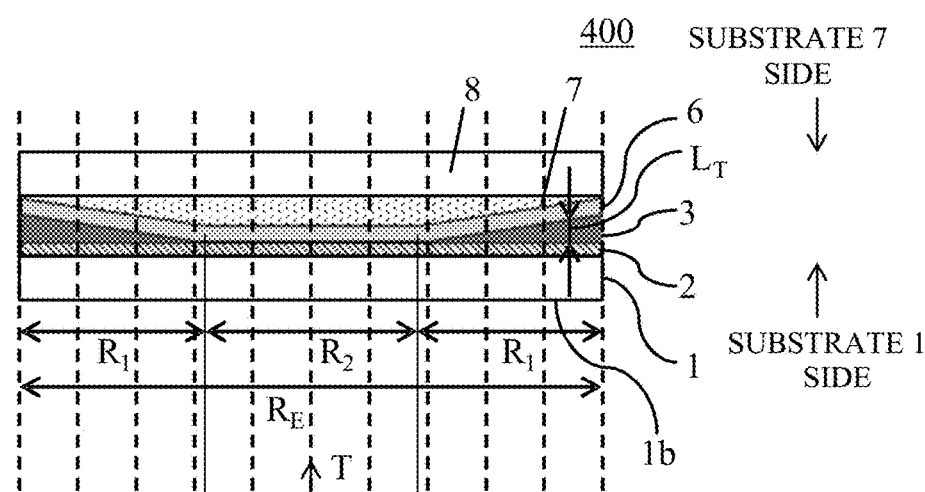
FIGS. 10A to 10C are schematic views of an optical filter according to Example 4.
Figure 10B:
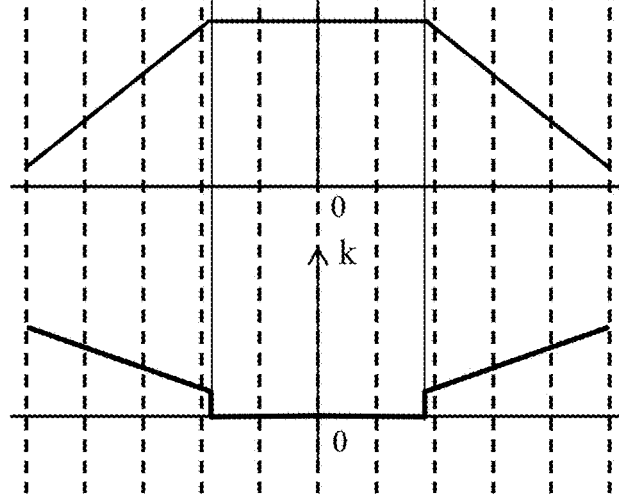
Figure 10C:
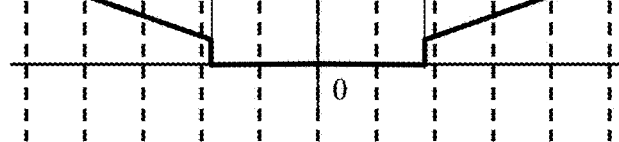

A description will be given of an optical filter (optical element) 400 according to Example 4. As illustrated in FIG. 10A, the optical filter 400 is a gradation ND filter that includes, in order from the substrate 1, the intermediate antireflection layer 2, the absorption layer 3, the intermediate antireflection layer 6, an adhesive 7, and a substrate 8, and the transmittance decreases from the center toward the periphery. This embodiment is different in structure from Examples 1 to 3 in that the absorption layer 3 is provided between the substrates 1 and 8 and no surface antireflection layer that contacts air is included.

Table 4 shows characteristics of each element of the optical filter 400.

TABLE 4

| Film Number | Refractive Index | Film Thickness [nm] | Extinction Coefficient | Note |
|---|---|---|---|---|
| sub2 | 1.5419 | — | — | Substrate 8 |
| Ad | 1.5600 | — | — | Adhesive Layer 7 |
| 64 | 1.6697 | 65.4 | 0 | Intermediate |
| 63 | 2.1174 | 10.3 | 0 | Antireflection |
| 62 | 1.6697 | 21.3 | 0 | Layer 6 |
| 61 | 2.1174 | 52.4 | 0 | |
| 32 | 2.3500 | Variable | 0.0645~0.2579 | Absorption |
| 31 | 2.2000 | Variable | 0.0464~0.1857 | Layer 3 |
| 24 | 2.1174 | 56.1 | 0 | Intermediate |
| 23 | 1.6697 | 37.6 | 0 | Antireflection |
| 22 | 2.1174 | 18.2 | 0 | Layer 2 |
| 21 | 1.6697 | 41.7 | 0 | |
| sub1 | 1.7610 | — | — | Substrate 1 |

This example makes the absorption layer 3 of two layers, and provides the light absorption characteristic of the absorption layer 3 approximately equivalent regardless of the wavelength in the range of 400 nm to 700 nm. The intermediate antireflection layers 2 and 6 are provided on the sides of the substrates 1 and 8 of the absorption layer 3 to reduce the reflectance for the interface of each substrate. The substrate 1 is made of S-TIH4 manufactured by Ohara Inc., and the substrate 8 is made of S-BAL12. By providing the adhesive layer 7 on the side of the substrate 8 having a refractive index closer to that of the adhesive layer 7, the reflectance between the adhesive layer 7 and the substrate 8 is reduced. The extinction coefficient at the wavelength of 550 nm of the absorption layer 3 increases from the center toward the periphery, and has a minimum value of the film 31 of 0.0464 and a maximum value of 0.1857, a minimum value of the film 32 of 0.0645, and a maximum value of 0.2579. The maximum value ODmax of the optical density is 3.0 due to the light absorption in the absorption layer 3, and the extinction coefficient has a maximum value in the area where the optical density is maximum. Each of the intermediate antireflection layers 2 and 6 has a four-layer structure made of the same materials, but the number of layers may be changed or the layers may be made of different materials.

Figure 11:
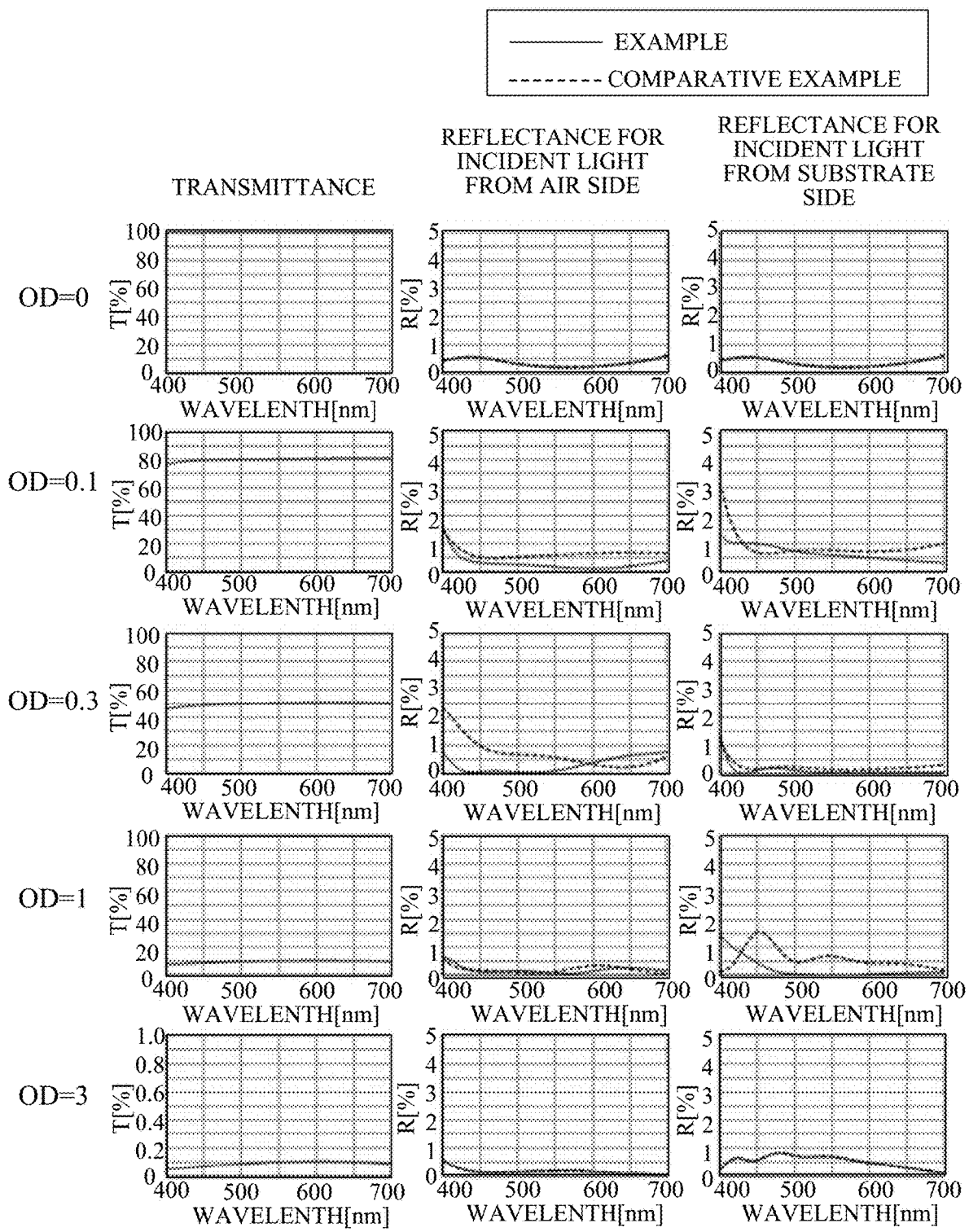
FIG. 11 illustrates spectral transmittances and spectral reflectances of the optical filter according to Example 4.

FIG. 11 illustrates the spectral transmittances and the spectral reflectances of the optical filter 400 for the light for the incident light from the substrate 1 side for the incident light from the substrate 8 side. FIG. 11 illustrates the spectral transmittances and the spectral reflectances at positions where the optical density OD is 0, 0.1, 0.3, 1, 3 for the light having the wavelength of 550 nm. The comparative example is illustrated similar to Example 1.

Figure 12:
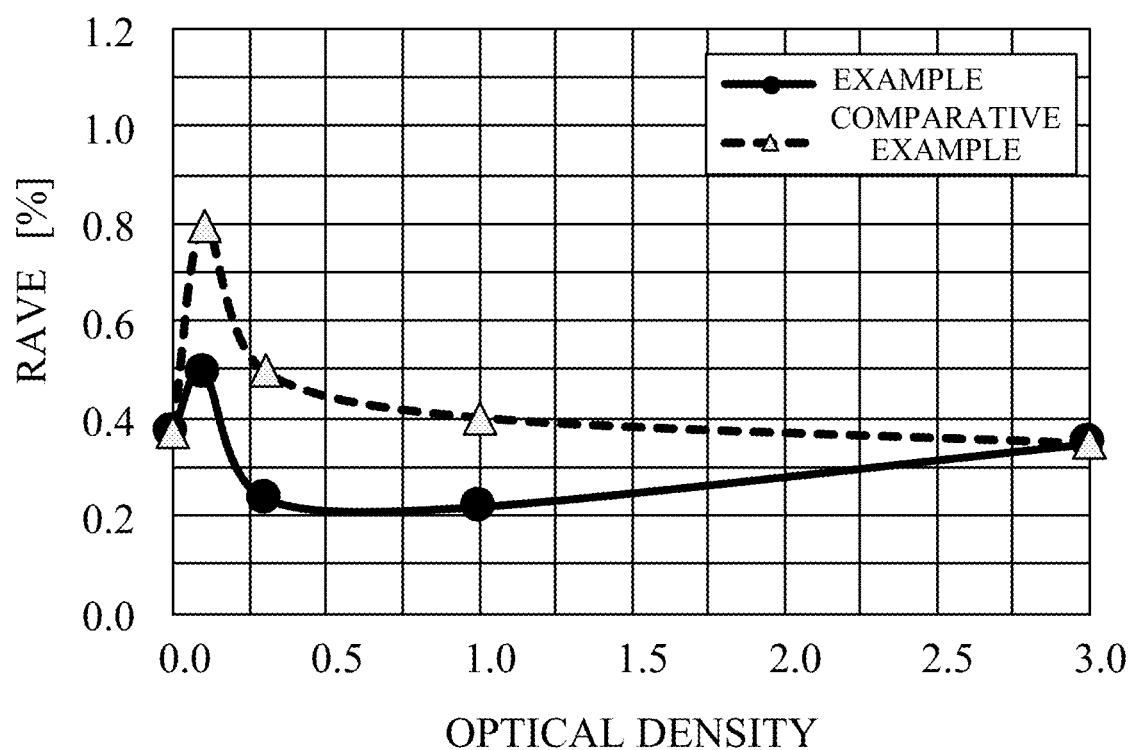
FIG. 12 illustrates a relationship between an optical density and an average reflectance according to Example 4.

FIG. 12 illustrates the average reflectance Rave of the optical filter 400 at each optical density. Similar to Examples 1 to 3, since the conditional expressions (3), (4), and (5) are satisfied, the average reflectance Rave is low regardless of the optical density.

Table 5 shows each parameter value at the wavelength of 550 nm for the optical filters in Examples 1 to 4.

TABLE 5

| | Example 1 | Example 2 | Example 3 | Example 4-1 | Example 4-2 |
|---|---|---|---|---|---|
| kmax | 0.2180 | 1.2407 | 0.1947 | 0.2579 | 0.1857 |
| kmm/kmax | 0.2293 | 0.1612 | 0.5271 | 0.2500 | 0.2500 |
| OPD1/λ | 3.6832 | 0.5995 | 3.0245 | 5.6385 | |
| dOD/dmax | 0.0922 | 0.0749 | 0.1053 | 0.0768 | 0.0768 |
| ODmax | 2.0 | 2.0 | 1.5 | 3.0 | |
| LOG(Tmin/Tmax) | −2.000 | −2.000 | −0.978 | −3.000 | |
| k_OD0.1 | 0.1182 | 0.8285 | 0.1232 | 0.1120 | 0.0806 |
| k_OD0.3 | 0.1555 | 0.9825 | 0.1534 | 0.1659 | 0.1194 |

TABLE 5-continued

|         | Example 1 | Example 2 | Example 3 | Example 4-1 | Example 4-2 |
|---------|-----------|-----------|-----------|-------------|-------------|
| k_OD1   | 0.2066    | 1.1934    | 0.1947    | 0.2397      | 0.1726      |
| k_OD1.5 | —         | —         | 0.1947    | —           | —           |
| k_OD2   | 0.2180    | 1.2407    | —         | —           | —           |
| k_OD3   | —         | —         | —         | 0.2579      | 0.1857      |
| dOD     | 85.3      | 12.2      | 81.8      | 52.3        | 52.3        |
| dmax    | 924.4     | 162.5     | 776.5     | 681.6       | 681.6       |

The optical filters according to Examples 1 to 4 are easy to manufacture, have high antireflection effects on incident light from the surface side and on incident light from the substrate side in areas having different transmittances in the substrate surface, and can suppress ghosted, flares, etc. Therefore, each example can provide an optical element, an optical system, and an imaging apparatus, each of which is easy to create and has high antireflection performance for areas having different transmittances.

A description will now be given of a configuration that is suitable for the configuration of the antireflection layer in the optical filters according to Examples 1 to 5 described above. The characteristic configurations of the antireflection layers described for Examples 5 to 10 described below may be applied to the optical filters according to Examples 1 to 5.

Example 5

Figure 13A:
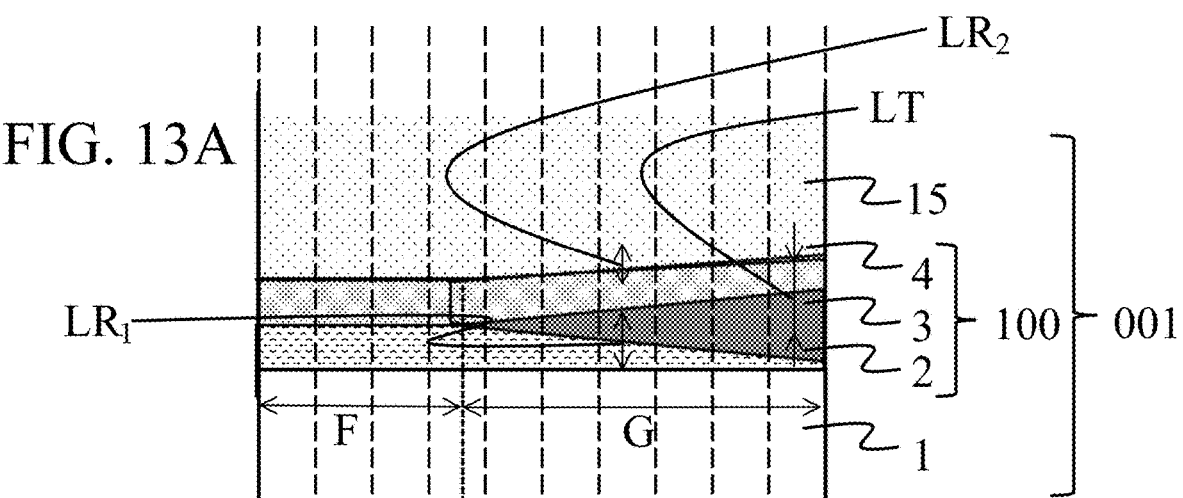
FIGS. 13A and 13B explain optical elements according to Examples 5 to 9.
Figure 13B:
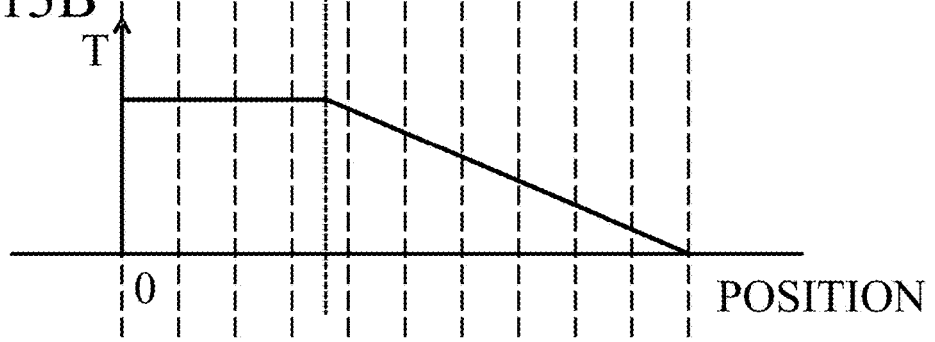

Referring now to FIG. 13, a description will be given of a schematic configuration of the optical element 001 according to Example 5 of the present invention. FIGS. 13A and 13B are explanatory diagrams of the optical element 001, FIG. 13A is a sectional view of the optical element 001, and FIG. 13B illustrates a transmittance distribution of the optical element 001. In FIG. 13B, the abscissa axis denotes the position in the in-plane direction, and the ordinate axis denotes the transmittance T.

As illustrated in FIG. 13A, the optical element 001 includes a transparent material (first light-transmitting member) 1, an optical filter 100, and a transparent material (second light-transmitting member) 5. The optical filter 100 includes an antireflection layer (first antireflection layer) 2, an absorption layer 3, and an antireflection layer (second antireflection layer) 4 in this order from the transparent material 1 side (the lower side in FIG. 13A). In other words, the optical element 001 includes the transparent material 1, the antireflection layer 2 disposed on the transparent material 1, the absorption layer 3 disposed on the antireflection layer 2, and the antireflection layer 4 disposed on the absorption layer 3. The transparent material 15 is disposed on the antireflection layer 4. In this embodiment, the optical filter 100 may not include any one of the antireflection layers 2 and 4. In this embodiment, each of the antireflection layers 2 and 4 includes a thin film composed of one or more layers. Each of the antireflection layers 2 and 4 may have more layers in order to adjust the refractive index, to expand the antireflection wavelength band, to reduce the incident angle dependency, or to reduce the polarization dependency. The absorption layer 3 has the configuration described in Examples 1 to 5. The transparent material 1 is a substrate (light-transmitting substrate) having a refractive index of 1.3 or higher. The transparent material 15 is air, an adhesive, or a substrate, but is not limited, and may be another member.

As illustrated in FIGS. 13A and 13B, the transmittance of the optical filter 100 continuously changes in the in-plane direction (the lateral direction (first direction) in FIG. 13A).

The optical element 001 has an area G where the transmittance changes. In the area G, the thickness LT of the absorption layer 3 in the optical filter 100 (thickness in the vertical direction (second direction) in FIG. 13A) continuously increases from left to right. The absorption layer 3 is not formed in the area F where the transmittance is constant. On the other hand, the film thickness $LR_1$ of the antireflection film 2 and the film thickness $LR_2$ of the antireflection film 4 continuously decrease from left to right in at least part of the area G. In the increasing direction of the thickness LT of the absorption layer 3, the film thickness $LR_1$ of the antireflection film 2 and the film thickness $LR_2$ of the antireflection film 4 decrease in an area. At this time, the area where the film thicknesses $LR_1$ and $LR_2$ decrease may be the entire area G or part of the area G. In an area F where the transmittance is constant, the film thickness $LR_1$ of the antireflection film 2 and the film thickness $LR_2$ of the antireflection film 4 are approximately uniform (uniform or substantially uniform). The approximately uniform thickness includes a thickness change due to minute unevenness depending on the particle size of the laminated material and the density of the laminated layer.

In this embodiment, the optical filter 100 is a gradation type ND filter in which the transmittance varies due to the film thickness of the absorption layer 3 by continuously changing the film thickness of the absorption layer 3. As illustrated in FIG. 13B, the optical filter 100 has a lower transmittance T as the absorption layer 3 becomes thicker. When the gradation type ND filter is obtained by changing the film thickness of the absorption layer 3 as illustrated in FIG. 13A, the reflectance changes according to the change in the film thickness of the absorption layer 3. It is thus difficult to reduce the reflectance in the entire area in the in-plane direction of the ND filter (the lateral direction in FIG. 13A). On the other hand, the optical filter 100 according to this embodiment can suppress a decrease in the antireflection performance by reducing the film thickness of at least one of the antireflection layers 2 and 4 in the increasing direction of the film thickness of the absorption layer 3.

In this embodiment, the layer whose thickness decreases in the thickness increasing direction of the absorption layer 3 may be at least one or all of the thin films constituting the antireflection layer 2 and 4. In addition, the area in which the thickness of the thin film constituting the antireflection layers 2 and 4 decreases is only part or all of the area in which the thickness of the absorption layer 3 increases (area G in FIG. 13A).

The reduced thicknesses of the antireflection layers 2 and 4 in the increasing direction of the optical thickness of the absorption layer 3 contribute to simple manufacturing. When the optimal antireflection films 2 and 4 are formed in accordance with the increase in the optical film thickness of the absorption layer 3, it is necessary to use a shielding mask having a complicated shape during the film formation, which is difficult to manufacture. The simply reduced film thickness can be easily implemented by devising the lens shape, by adjusting the substrate position in the vapor deposition apparatus, etc.

In the optical filter 100 according to this embodiment, the following conditional expressions (10) and (11) may be satisfied:

$$\lambda/8 \leq d \leq 3\lambda/8 (\lambda=550 \text{ nm}) \tag{9}$$

$$0.85 \leq Dx_1/Dc_1 \leq 0.998 \tag{10}$$

$$0.85 \leq Dx_2/Dc_2 \leq 0.998 \tag{11}$$

where $Dc_1$ is a maximum optical film thickness (maximum value of the film thickness $LR_1$) of the antireflection film 2, and $Dc_2$ is a maximum optical film thickness (maximum value of the film thickness $LR_2$) of the antireflection film 4. The maximum optical film thicknesses $Dc_1$ and $Dc_2$ correspond to the film thicknesses in the area F illustrated in FIG. 13A. $Dx_1$ and $Dx_2$ are total optical film thicknesses of the antireflection layers 2 and 4 at the position x where the optical film thickness d of the absorption layer 3 falls within a range of a conditional expression (9).

Figure 14:
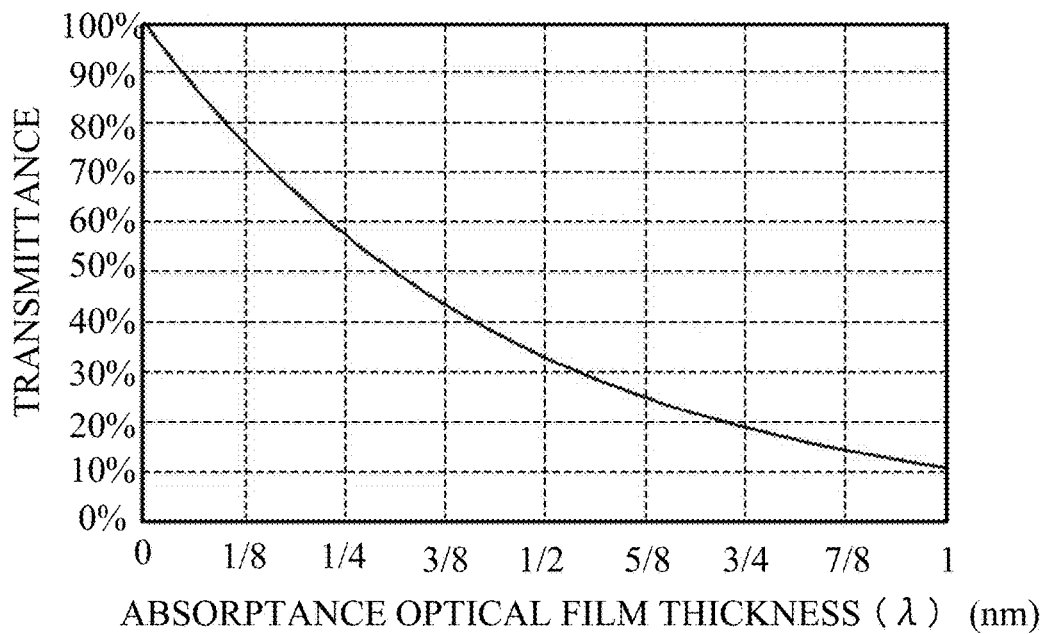
FIG. 14 illustrates a relationship between a transmittance and an optical film thickness of an absorption layer having an extinction coefficient $\kappa=0.30$ according to Examples 5 to 9.

The optical filter 100 according to this embodiment restrain an increase of the reflectance by adjusting the interference wave shift due to the increase in the optical film thickness of the absorption layer 3 through the reduced film thickness of the antireflection layers 2 and 4. In general, the reflected waves when light having the wavelength λ, vertically enters a thin film cancel each other whenever the optical film thickness of the thin film is $\lambda/4 \times 2n$ (n: integer), and are intensified whenever it is $\lambda/4 \times 2(n-1)$. This means that the optimum antireflection structure is significantly different between the optical film thickness of the thin film of $\lambda/4 \times 2n$ and the optical film thickness of the thin film of $\lambda/4 \times 2(n-1)$. On the other hand, FIG. 14 illustrates a relationship between the transmittance and the optical film thickness $(\times \lambda)$ ($\lambda$=550 nm) in the absorption layer having the extinction coefficient $\kappa$=0.30. When the optical film thickness is $\lambda/2$ or larger, the transmittance is 35% or less, and as the film thickness of the absorption layer 3 increases, the influence of the film thickness change of the absorption layer 3 decreases. The optical filter according to this embodiment assumes the visible light area (420 nm to 680 nm) is the use wavelength area, and the center wavelength of 550 nm is the reference wavelength. From the above, the optimal antireflection film configuration is different between when the optical layer thickness of the absorption layer 3 is 0 and when the optical layer thickness of the absorption layer 3 is close to $\lambda/4$ ($\lambda$=550 nm) or falls within the range that satisfies the conditional expression (9), and thus the adjustment of the individual optical film thickness is important.

Where the optical film thickness d of the absorption layer 3 falls within the range that satisfies the conditional expression (9) and the value is higher than the upper limit in each of the conditional expressions (10) and (11), the antireflection effect is small similar to the case where the optical film thickness d of the absorption layer 3 is 0. Where the value is lower than the lower limit in each of the conditional expressions (10) and (11), the antireflection layer is so thin that the antireflection effect is small.

When the absorption layer 3 is a multilayer film including m layers, the conditional expressions (10) and (11) may be satisfied where dx is an optical film thickness of the thin film layer in which the film thickness reduces at the position x within a range in which the optical film thickness $d_m$ of each thin film layer satisfies the following conditional expression (9-1):

$$\lambda/8 \le d_m \le 3\lambda/8 \quad (9\text{-}1)$$

In this embodiment, the film thicknesses of the antireflection layers 2 and 4 (maximum optical film thicknesses $Dc_1$ and $Dc2$, total optical film thicknesses $Dx_1$ and $Dx_2$) may satisfy the following conditional expression (12).

$$0.95 \le (Dx_1/Dc_1)/(Dx_2/Dc_2) \le 1.05 \quad (12)$$

This means that the respective film thickness distributions in the surfaces of the antireflection films 2 and 4 are substantially the same. Since the antireflective layers 2 and 4 can be formed under approximately the same film forming conditions, manufacturing becomes easier.

In this embodiment, the transparent material 1 of the optical element 001 may have a lens shape. In forming a film for a lens having a curvature shape through a vapor deposition apparatus, it is relatively easy to thicken the center thick and to thin the periphery. Assume that the transparent material 1 has a lens shape, and L is an effective ray radius. Then, in an area from 0.2 L to 0.9 L from the optical axis center to the periphery of the transparent material 1, the optical film thickness d of the absorption layer 3 increases, and at least one of the optical film thickness $LR_1$ of the antireflection film 2 and the optical film thicknesses $LR_2$ of the antireflection film 4 decreases in the first direction.

In the optical filter 100, the extinction coefficient $\kappa$ of the absorption layer 3 (the extinction coefficient at the position where the absorption layer 3 has the maximum thickness) may satisfy the following conditional expression (13).

$$0.05 \le \kappa \le 0.5 \quad (13)$$

If the value deviates from the range of the conditional expression (13), it is difficult to realize an appropriate antireflection layer for the optical filter 100.

In this embodiment, the absorption layer 3 of the optical filter 100 may include one or more layers. The absorption layer 3 may have an area whose optical film thickness is 0 nm, or the absorption layer 3 may not be formed at the center part.

When producing the optical filter 100, the transparent materials 1 and 5 may use any materials that are transparent in the visible area. At this time, one of the transparent materials 1 and 5 is a transparent material, such as glass and plastic. The other may be air or an adhesive used to form a cemented lens. The adhesive as the transparent material may contain an epoxy, polyene polythiol, or acrylic based material. In particular, a UV-curable polyene polythiol based adhesive may be used because it is a step reaction and a processing tact is short.

One method for forming the absorption layer 3 having a film thickness distribution includes the vapor deposition and sputtering. The absorption layer 3 having an arbitrary transmittance distribution can be formed by using a mask having an arbitrary shape during the vapor deposition or sputtering. In addition, a wet process method may be used such as a plating method and spin coating. The material of the absorption layer 3 may satisfy the condition of the extinction coefficient $\kappa$, such as oxygen deficient $TiO_2$, $Nb_2O_5$, and $Ta_2O_5$. For the wavelength flatness of the spectral transmittance of the ND filter, materials having different signs in the wavelength dispersion of the extinction coefficient $\kappa$ in the use wavelength band may be combined.

The method for forming the antireflection layers 2 and 4 includes the vapor deposition and sputtering. As described above, the method for providing the film thickness distribution is to form the antireflection layer having a desired film thickness distribution by devising the installation position of a shielding mask or base material having an arbitrary shape. In a lens having a curvature, it is relatively easy to make the center thick and the periphery thin. For example, the film thickness distribution can be controlled by devising the installation location during the film formation.

Figures 31A, 31B, 31C, 31D:
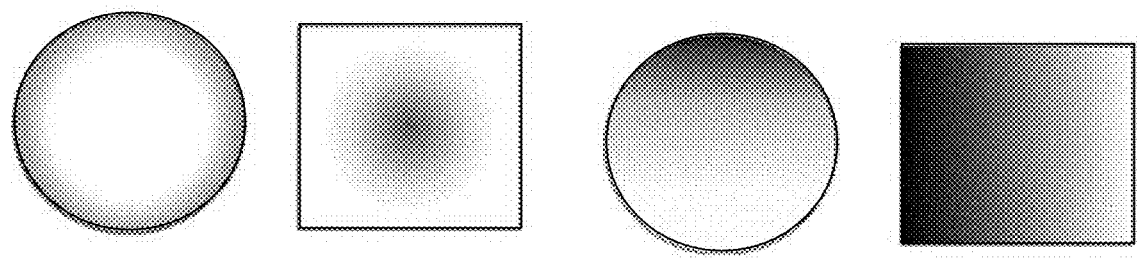
FIGS. 31A to 31D are illustrative transmittance distributions according to Examples 5 to 9.

A variety of shapes can be used for the transmittance distribution of the gradation type ND filter. FIGS. 31A to 31D are illustrative transmittance distributions. For example, as illustrated in FIGS. 31A and 31B, the transmittance distribution can be formed in the concentric direction. Alternatively, as illustrated in FIGS. 31C and 31D, the transmittance may change in one direction. Other than that, there are a variety of transmittance distribution shapes depending on applications, but the configuration of this embodiment is applicable to any transmittance distribution shape.

Thus, in this embodiment, the optical element 001 has the area G in which the transmittance changes in the first direction (lateral direction in FIG. 13A), and includes the absorption layer 3 and the first antireflection layer (antireflection layer 2) in the second direction (longitudinal direction in FIG. 13A) orthogonal to the first direction. The first antireflection layer 2 includes a plurality of thin films 21 and 22 (see FIG. 15). The thickness of the absorption layer in the second direction changes in the first direction. The thicknesses of at least two of the plurality of thin films may have at least part of a range that increases in the direction (left direction in FIG. 13A) opposite to the thickness increasing direction of the absorption layer (right direction in FIG. 13A).

The thicknesses of all of the plurality of thin films may have at least part of a range that increases in a direction opposite to the thickness increasing direction of the absorption layer. The optical element may have a second antireflection layer (antireflection layer 4) on the opposite side of the first antireflection layer with respect to the absorption layer (upper side of the absorption layer in FIG. 13A) in the second direction.

In this embodiment, an optical element includes the first antireflection layer, the absorption layer, and the second antireflection layer in this order in the second direction orthogonal to the first direction. The thickness of the absorption layer in the second direction changes in the first direction. Each thickness of the first antireflection layer and the second antireflection layer has at least part of a range that increases in a direction opposite to the thickness increasing direction of the absorbing layer.

A description will now be given of specific examples. However, the present invention is not limited to these examples.

Figure 15:
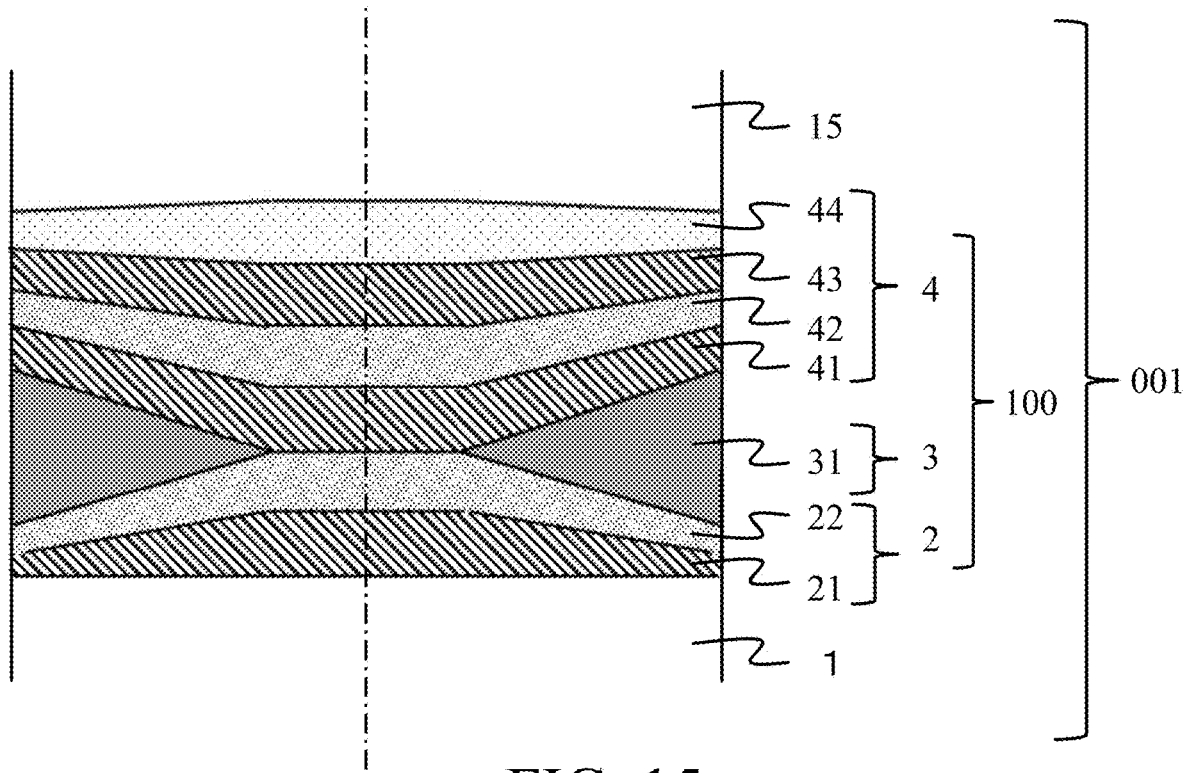
FIG. 15 is a schematic sectional view of the optical element according to Example 5.

FIG. 15 is a schematic sectional view of the optical element 001 including the optical filter 100 according to this example. The optical element 001 including the optical filter 100 has a configuration in which a gradation type ND filter whose transmittance gradually decreases from the optical axis center toward the periphery on the optical surface is formed on the transparent material 1.

Table 6 shows the film configuration of the optical element 001 including the optical filter 100 according to this example, such as the film thickness of each thin film and $D_x/D_c$ (%) when the film thickness of the thin film 31 in the absorption layer 3 is 0, $\lambda/8$, $3\lambda/8$, $\lambda$, and $4\lambda$. Herein, $D_c$ is a film thickness of each thin film when the optical film thickness of the absorption layer 3 is 0, and $D_x$ is a physical film thickness of each thin film when the optical film thickness of the absorption layer 3 is $\lambda/8$, $3\lambda/8$, $\lambda$, and $4\lambda$.

Figure 16:
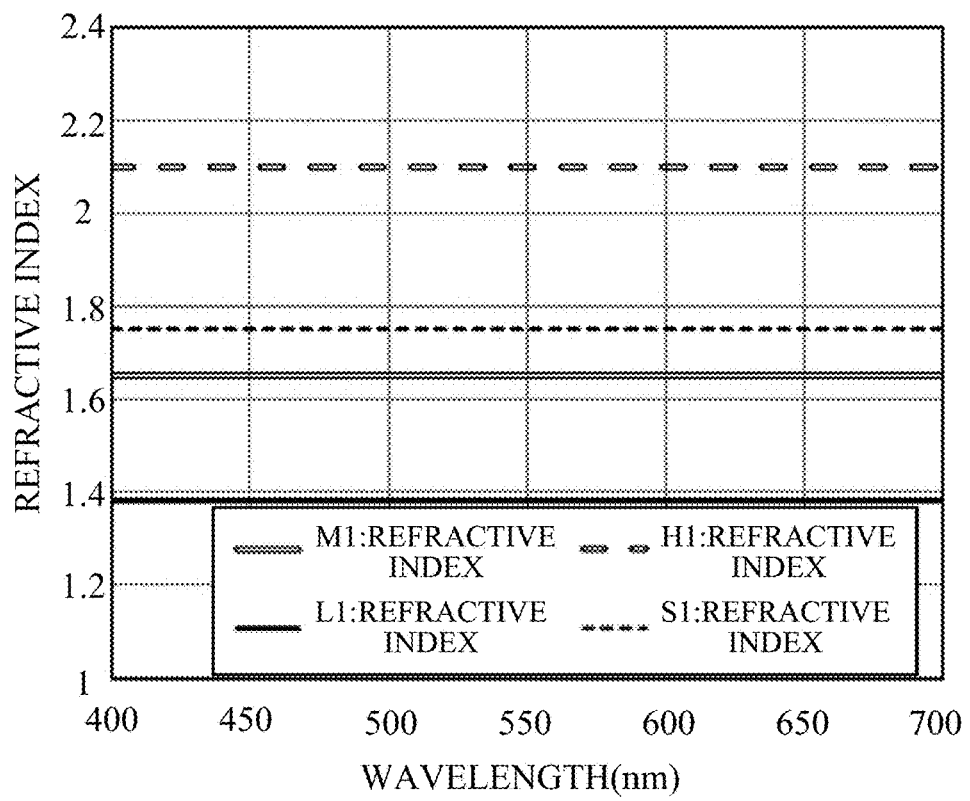
FIG. 16 illustrates refractive indexes of each material of the optical elements in Example 5 and the comparative example.

The transparent material 1 uses a glass material S1, and the transparent material 15 is air. The glass material S1 is a substantially non-absorbing material. The antireflection layer 2 includes thin films 21 and 22, and the antireflection layer 4 includes thin films 41, 42, 43, and 44. The film material for the thin films 21, 41, 43 is H1, the film material for the thin films 22, 42 is M1, and the film material for the thin film 44 is L1. The film materials M1, H1, and L1 are substantially non-absorbing materials. FIG. 16 illustrates the refractive indexes of the glass material S1 and the film materials M1, H1, and L1. The absorption layer 3 includes a thin film 31, which is made of an absorbing material A1.

Figure 17:
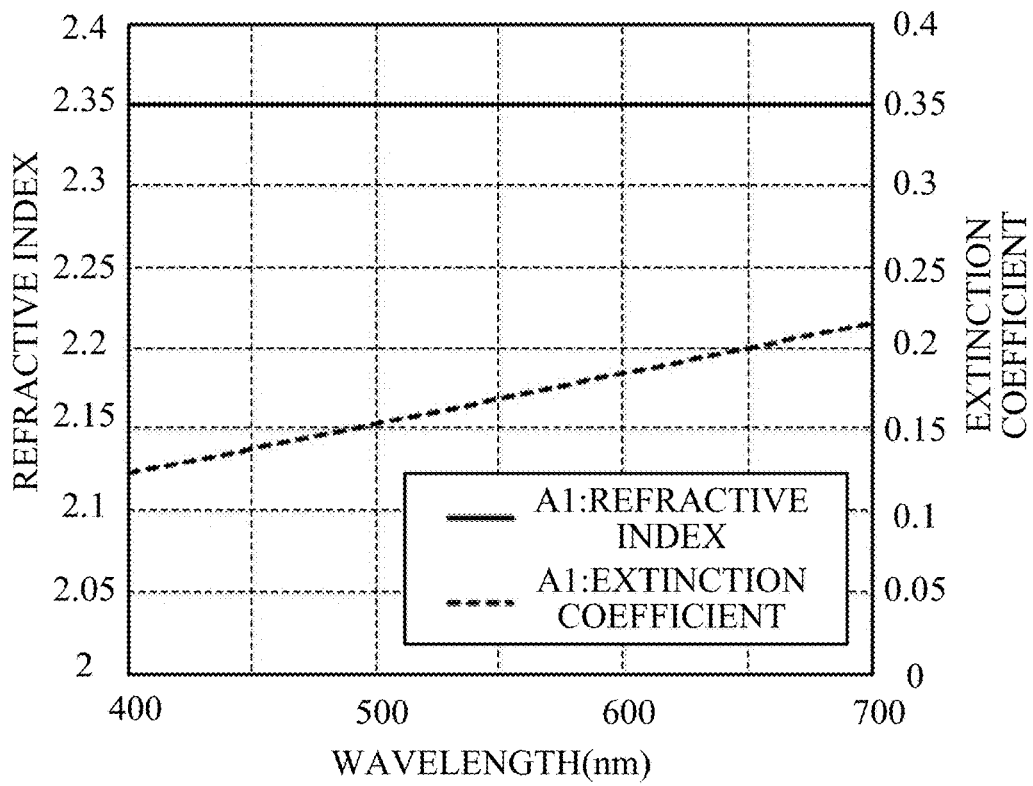
FIG. 17 illustrates refractive indexes and extinction coefficients of the absorbing materials in the optical elements according to Example 5, the comparative example, and Example 6.

FIG. 17 illustrates the refractive index and extinction coefficient of the absorbing material A1. As illustrated in Table 6, as the film thickness of the absorption layer 3 in the optical filter 100 increases, the optical film thicknesses of the thin films 21, 22, 41, 42, 43, and 44 in the antireflection layers 2 and 4 decrease.

On the other hand, Table 7 shows a film configuration of optical elements including an optical filter according to a comparative example. Similar to this example, the optical element according to the comparative example includes a gradation type ND filter formed on the transparent material 1, in which the transmittance gradually decreases from the optical axis center toward the periphery on the optical plane, and has the same film materials and the same film structure as those of the optical element 001 according to this example. As shown in Table 7, the optical filter according to the comparative example maintain constant the optical film thicknesses of the thin films 21, 22, 41, 42, 43, and 44 in the antireflection layers even when the film thickness of the absorption layer 3 increases.

Figure 18:
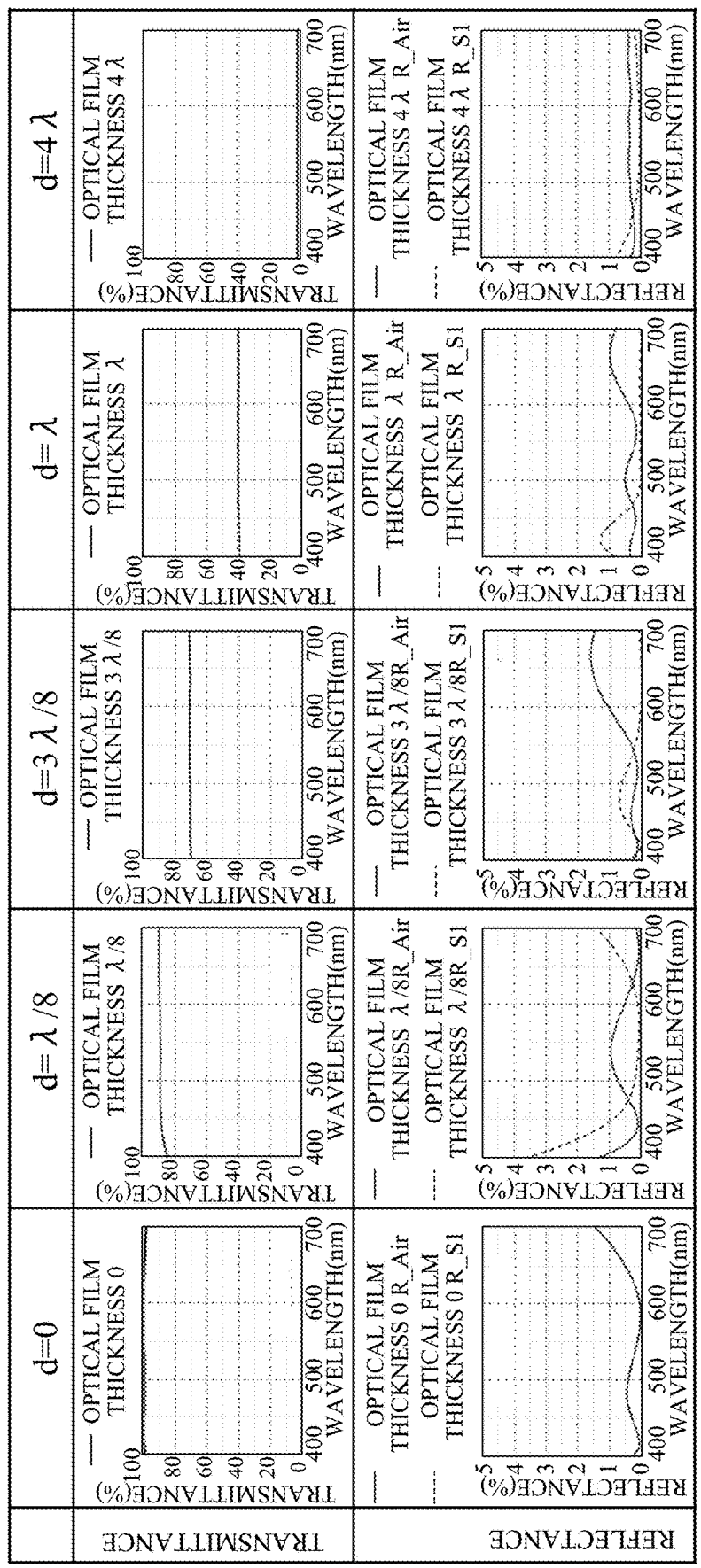
FIG. 18 illustrates spectral transmittances and spectral reflectances of the optical element according to Example 5.
Figure 19:
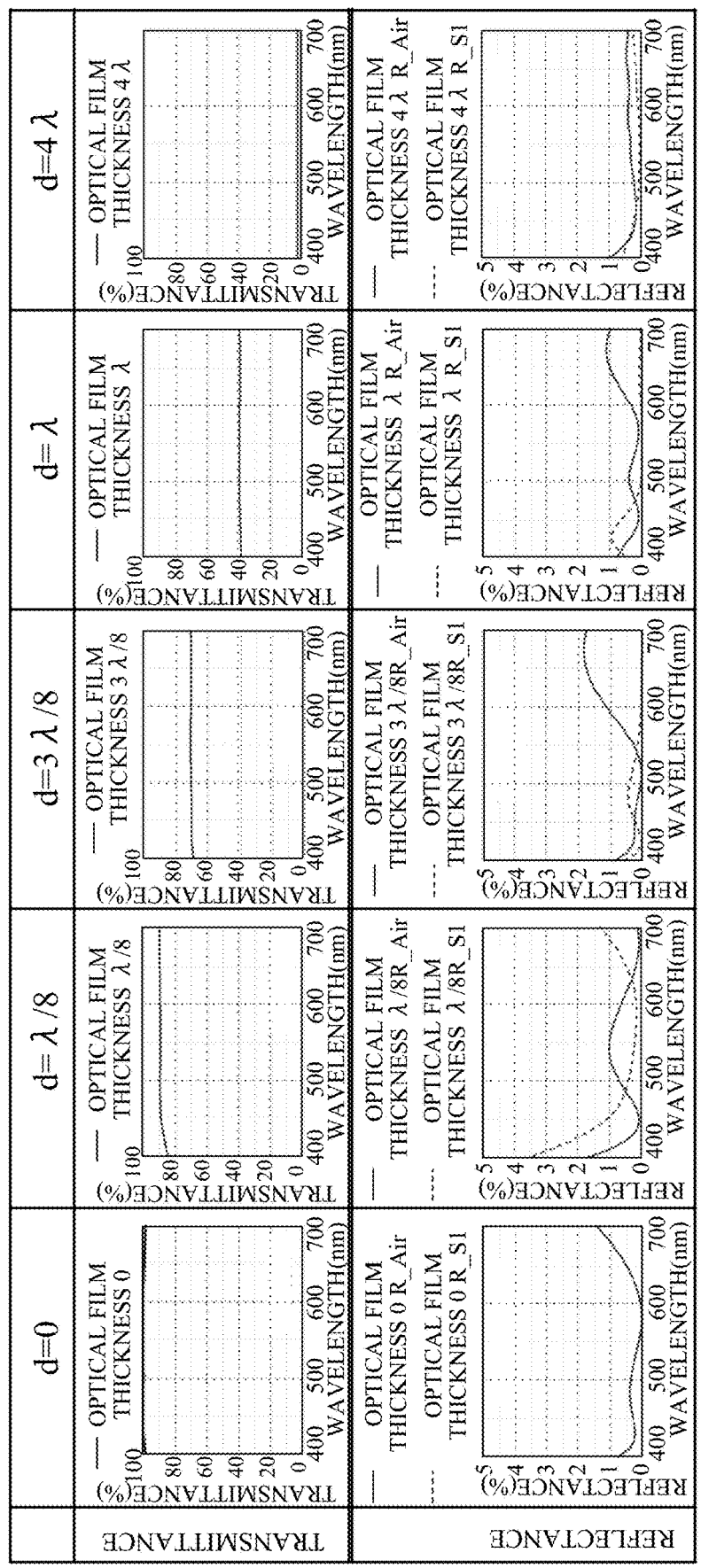
FIG. 19 illustrates a spectral transmittance and a spectral reflectance of the optical element according to the comparative example.

FIG. 18 illustrates the spectral transmittances and the spectral reflectances of the optical filter 100 according to this example. FIG. 19 illustrates spectral transmittances and spectral reflectances of the optical filter according to the comparative example. In FIGS. 18 and 19, R_Air represents the spectral reflectance for the incident light from the air side, and R_S1 represents the spectral reflectance for the incident light from the transparent material S1 side.

When the film thickness d of the thin film 31 is 0, the maximum value of the spectral reflectance in the visible area (light having a wavelength of 420 nm to 680 nm) is 1.03% in both this example and the comparative example. Hence, when the film thickness d of the thin film 31 is 0, it is understood that it has the approximately same antireflection characteristic. On the other hand, when the film thickness d of the thin film 31 is $\lambda/8$, the maximum value of the spectral reflectance for the incident light from the air side in the visible area (light having a wavelength of 420 nm to 680 nm) is 0.96%, in this example and 1.03% in the comparative example. The maximum value of the spectral reflectance for the incident light from the transparent material S1 side is 2.2% in this example and 2.3% in the comparative example. Therefore, it can be confirmed that this example exhibits a better antireflection effect when the film thickness d of the thin film 31 is $\lambda/8$.

When the film thickness d of the thin film 31 is $3\lambda/8$, both this example and the comparative example have a higher spectral reflectance for the incident light from the air side. The maximum value of the spectral reflectance for the incident light from the air side in the visible area (light having a wavelength of 420 nm to 680 nm) is 1.6% in this example and 1.9% in the comparative example. Therefore, it can be confirmed that this example exhibits a better antireflection effect when the film thickness d of the thin film 31 is $3\lambda/8$.

Thus, it can be said that this example exhibits a better antireflection effect when the film thickness d of the thin film 31 is $\lambda/8$ and $3\lambda/8$ than that of the comparative example. It is understood from FIG. 18 that when the film thickness d of the thin film 31 is 0, $\lambda/8$, $3\lambda/8$, $\lambda$, and $4\lambda$, the spectral reflectance is low, and the optical filter 100 according to this example has an excellent antireflection effect.

TABLE 6

| | Material | Refractive Index (λ = 550 nm) | Optical Film Thickness of Thin Film 31 (nm) (λ = 550 nm) | | 0 | λ/8 | 3λ/8 | λ | 4λ |
|---|---|---|---|---|---|---|---|---|---|
| | | | | | \multicolumn{5}{c}{Physical Film Thickness (nm)} | | | | |
| Transparent Material 5 | Air | 100 | | | — | — | — | — | — |
| Surface Antireflection Layer 4 | Thin Film 44 | L1 | 1.38 | Physical Film Thickness(nm) | 97.24 | 96.97 | 96.47 | 95.53 | 94.25 |
| | | | | $D_x/D_c$(%) | 100.0 | 99.7 | 99.2 | 98.2 | 96.9 |
| | Thin Film 43 | H1 | 2.1 | Physical Film Thickness(nm) | 34.57 | 34.48 | 34.30 | 33.97 | 33.51 |
| | | | | $D_x/D_c$(%) | 100.0 | 99.7 | 99.2 | 98.2 | 96.9 |
| | Thin Film 42 | M1 | 1.65 | Physical Film Thickness(nm) | 10.01 | 9.98 | 9.93 | 9.83 | 9.70 |
| | | | | $D_x/D_c$(%) | 100.0 | 99.7 | 99.2 | 98.2 | 96.9 |
| | Thin Film 41 | H1 | 2.1 | Physical Film Thickness(nm) | 8.00 | 7.98 | 7.94 | 7.86 | 7.75 |
| | | | | $D_x/D_c$(%) | 100.0 | 99.7 | 99.2 | 98.2 | 96.9 |
| Absorption Layer 3 | Thin Film 31 | A1 | 2.35 | Physical Film Thickness(nm) | 0.00 | 29.26 | 87.77 | 234.04 | 936.17 |
| Surface Antireflection Layer 2 | Thin Film 22 | M1 | 1.65 | Physical Film Thickness(nm) | 10.78 | 10.75 | 10.69 | 10.59 | 10.45 |
| | | | | $D_x/D_c$(%) | 100.0 | 99.7 | 99.2 | 98.2 | 96.9 |
| | Thin Film 21 | H1 | 2.1 | Physical Film Thickness(nm) | 40.00 | 39.89 | 39.69 | 39.30 | 38.77 |
| | | | | $D_x/D_c$(%) | 100.0 | 99.7 | 99.2 | 98.2 | 96.9 |
| Transparent Material 1 | Glass Material | S1 | 1.75 | | — | — | — | — | — |

TABLE 7

| | Material | Refractive Index (λ = 550 nm) | Optical Film Thickness of Thin Film 31 (nm) (λ = 550 nm) | | 0 | λ/8 | 3λ/8 | λ | 4λ |
|---|---|---|---|---|---|---|---|---|---|
| | | | | | \multicolumn{5}{c}{Physical Film Thickness (nm)} | | | | |
| Transparent Material 5 | Air | 100 | | | — | — | — | — | — |
| Surface Antireflection Layer 4 | Thin Film 44 | L1 | 1.38 | Physical Film Thickness (nm) | 100.00 | 100.00 | 100.00 | 100.00 | 100.00 |
| | | | | $D_x/D_c$(%) | 100.0 | 100.0 | 100.0 | 100.0 | 100.0 |
| | Thin Film 43 | H1 | 2.1 | Physical Film Thickness (nm) | 37.48 | 37.48 | 37.48 | 37.48 | 37.48 |
| | | | | $D_x/D_c$(%) | 100.0 | 100.0 | 100.0 | 100.0 | 100.0 |
| | Thin Film 42 | M1 | 1.65 | Physical Film Thickness (nm) | 9.21 | 9.21 | 9.21 | 9.21 | 9.21 |
| | | | | $D_x/D_c$(%) | 100.0 | 100.0 | 100.0 | 100.0 | 100.0 |
| | Thin Film 41 | H1 | 2.1 | Physical Film Thickness (nm) | 8.00 | 8.00 | 8.00 | 8.00 | 8.00 |
| | | | | $D_x/D_c$(%) | 100.0 | 100.0 | 100.0 | 100.0 | 100.0 |
| Absorption Layer 3 | Thin Film 31 | A1 | 2.35 | Physical Film Thickness (nm) | 0.00 | 29.26 | 87.77 | 234.04 | 936.17 |
| Surface Antireflection Layer 2 | Thin Film 22 | M1 | 1.65 | Physical Film Thickness (nm) | 10.61 | 10.61 | 10.61 | 10.61 | 10.61 |
| | | | | $D_x/D_c$(%) | 100.0 | 100.0 | 100.0 | 100.0 | 100.0 |
| | Thin Film 21 | H1 | 2.1 | Physical Film Thickness (nm) | 37.02 | 37.02 | 37.02 | 37.02 | 37.02 |
| | | | | $D_x/D_c$(%) | 100.0 | 100.0 | 100.0 | 100.0 | 100.0 |
| Transparent Material 1 | Glass Material | S1 | 1.75 | | — | — | — | — | — |

Example 6

A description will now be given of Example 6 according to the present invention. Similar to Example 5, the optical filter 100 according to this example is a gradation type ND filter in which the transmittance gradually decreases from the optical axis center toward the periphery on the optical plane. The optical filter 100 is formed on the transparent material 1. Table 8 shows the film configuration of the optical element 001 including the optical filter 100 according to this example, such as the film thickness of each thin film and $D_x/D_c$ (%) when the film thickness of the thin film 31 in the absorption layer 3 is 0, λ/8, 3λ/8, λ, and 4λ. $D_c$ is the film thickness of each thin film when the optical film thickness of the absorption layer 3 is 0, and $D_x$ is the physical film thickness of each thin film when the optical film thickness of the absorption layer 3 is λ/8, 3λ/8, λ, and 4λ.

Figure 20:
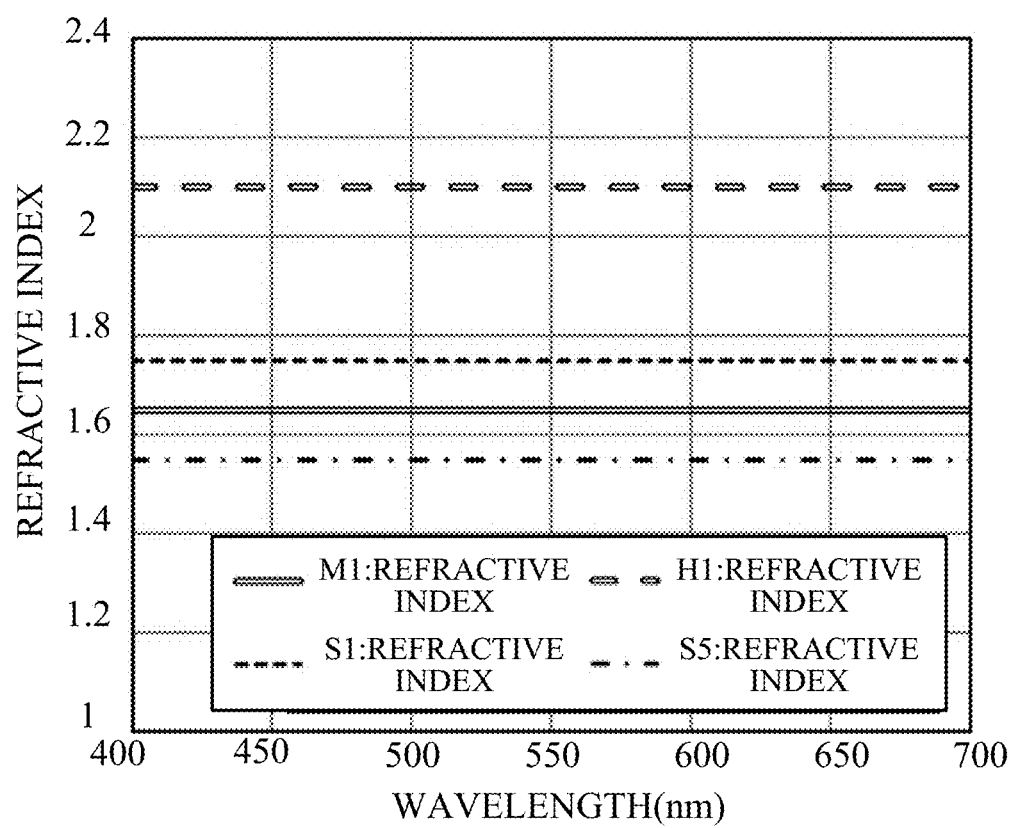
FIG. 20 illustrates a refractive index of each material in the optical element according to Example 6.

In this example, the transparent material 1 is a glass material S1, and the transparent material 15 is an adhesive S5. The glass material S1 and the adhesive S5 are substantially non-absorbing materials. The antireflection layer 2 includes thin films 21, 22, and 23, and the antireflection layer 4 includes thin films 41, 42, and 43. The film material for the thin films 21, 23, 41 and 43 is H1, and the film material for the thin films 22 and 42 is M1. The film materials M1 and H1 are substantially non-absorbing materials. FIG. 20 illustrates the refractive indexes of the glass material S1, the adhesive S5, and the film materials M1 and H1. The absorption layer 3 includes the thin film 31, which is made of the absorbing material A1. FIG. 17 illustrates the refractive index and extinction coefficient of the absorbing material A1. As illustrated in Table 8, as the thickness of the absorption layer 3 of the optical filter 100 increases, the optical thicknesses of the thin films 21, 22, 23, 41, 42, and 43 in the antireflection layers 2 and 4 decrease.

Figure 21:
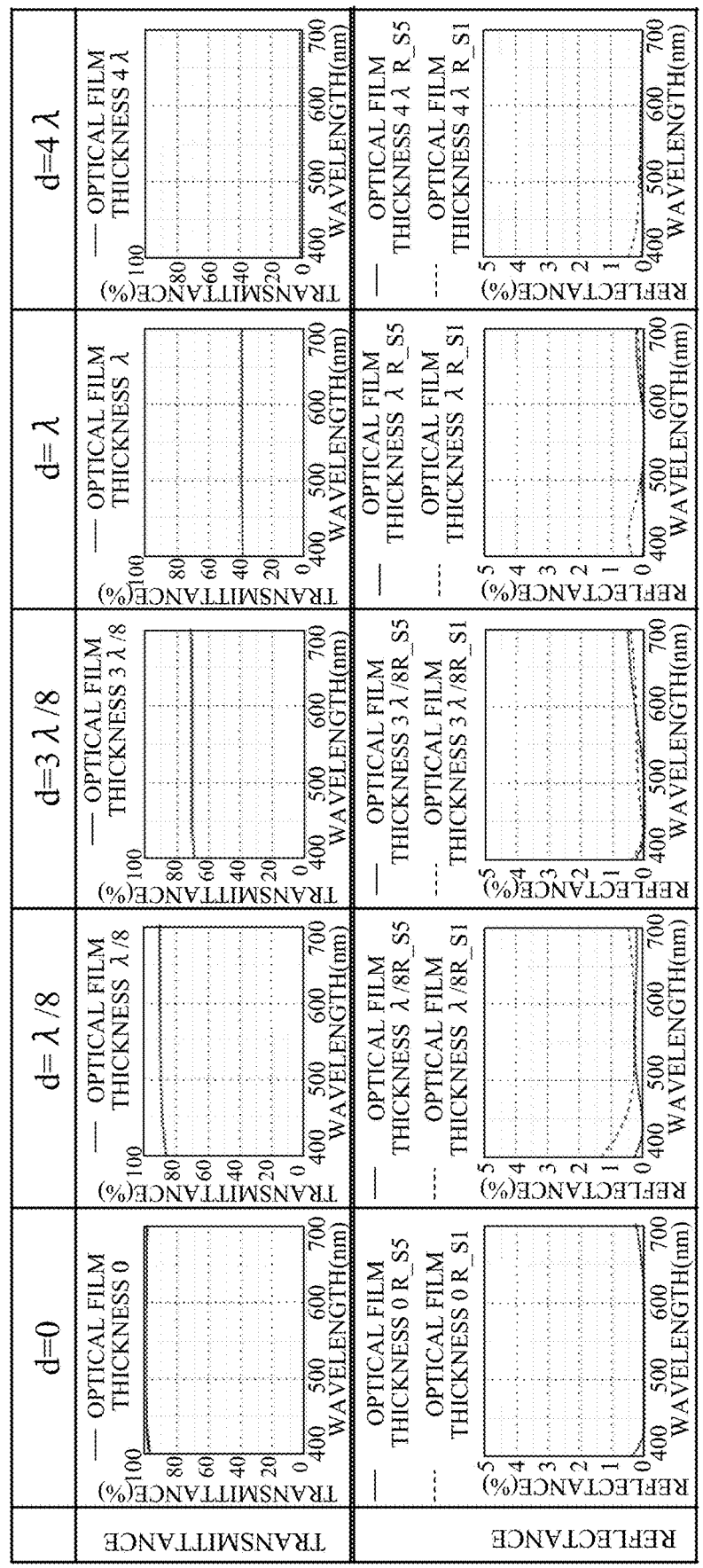
FIG. 21 illustrates spectral transmittances and spectral reflectances of the optical element according to Example 6.

FIG. 21 illustrates the spectral transmittances and the spectral reflectances of the optical filter 100 according to this example. In FIG. 21, R_S5 represents the spectral reflectance for the incident light from the transparent material S5 side, and R_S1 represents the spectral reflectance for the incident light from the transparent material S1 side. It is understood from FIG. 21 that when the film thickness d of the thin film 31 is 0, λ/8, 3λ/8, λ, and 4λ, the spectral reflectance is low, and the optical filter 100 according to this example exhibits an excellent antireflection effect.

TABLE 8

| | Material | | Refractive Index (λ = 550 nm) | Optical Film Thickness of Thin Film 31 (nm) (λ = 550 nm) | | 0 | λ/8 | 3λ/8 | λ | 4λ |
|---|---|---|---|---|---|---|---|---|---|---|
| | | | | | | \multicolumn{5}{c}{Physical Film Thickness (nm)} | | | | |
| Transparent Material 5 | Adhesive Layer | S5 | 1.55 | | | — | — | — | — | — |
| Surface Antireflection Layer 4 | Thin Film 43 | H1 | 2.1 | Physical Film Thickness (nm) | | 10.61 | 10.58 | 10.53 | 10.42 | 10.28 |
| | | | | $D_x/D_c$(%) | | 100.0 | 99.7 | 99.2 | 98.2 | 96.9 |
| | Thin Film 42 | M1 | 1.65 | Physical Film Thickness (nm) | | 44.89 | 44.76 | 44.53 | 44.10 | 43.51 |
| | | | | $D_x/D_c$(%) | | 100.0 | 99.7 | 99.2 | 98.2 | 96.9 |
| | Thin Film 41 | H1 | 2.1 | Physical Film Thickness (nm) | | 62.17 | 61.99 | 61.68 | 61.08 | 60.26 |
| | | | | $D_x/D_c$(%) | | 100.0 | 99.7 | 99.2 | 98.2 | 96.9 |
| Absorption Layer 3 | Thin Film 31 | A1 | 2.35 | Physical Film Thickness (nm) | | 0.00 | 29.26 | 87.77 | 234.04 | 936.17 |
| Surface Antireflection Layer 2 | Thin Film 23 | H1 | 2.1 | Physical Film Thickness (nm) | | 73.45 | 73.24 | 72.87 | 72.16 | 71.19 |
| | | | | $D_x/D_c$(%) | | 100.0 | 99.7 | 99.2 | 98.2 | 96.9 |
| | Thin Film 22 | M1 | 1.65 | Physical Film Thickness (nm) | | 29.42 | 29.34 | 29.19 | 28.91 | 28.52 |
| | | | | $D_x/D_c$(%) | | 100.0 | 99.7 | 99.2 | 98.2 | 96.9 |
| | Thin Film 21 | H1 | 2.1 | Physical Film Thickness (nm) | | 13.97 | 13.94 | 13.86 | 13.73 | 13.54 |
| | | | | $D_x/D_c$(%) | | 100.0 | 99.7 | 99.2 | 98.2 | 96.9 |
| Transparent Material 1 | Glass Material | S1 | 1.75 | | | — | — | — | — | — |

Example 7

A description will now be given of Example 7 according to the present invention. Similar to Example 5, the optical filter 100 according to this example is a gradation type ND filter in which the transmittance gradually decreases from the optical axis center toward the periphery on the optical plane. The optical filter is formed on the transparent material 1. The transparent material 15 is air. Table 9 shows the film configuration of the optical element 001 including the optical filter 100 in this embodiment, such as the film thickness of each thin film and $D_x/D_c$ (%) when the film thickness of the thin film 31 in the absorption layer 3 is 0, λ/8, 3λ/8, λ, and 4λ.

Figure 22:
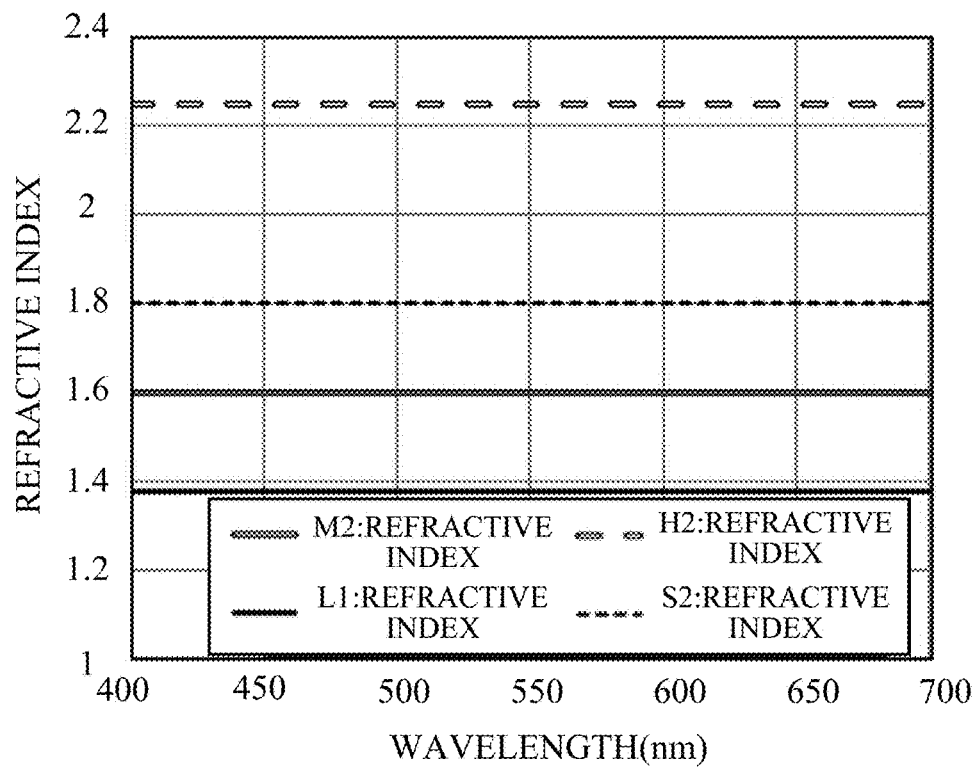
FIG. 22 illustrates a refractive index of each material in an optical element according to Example 7.
Figure 23:
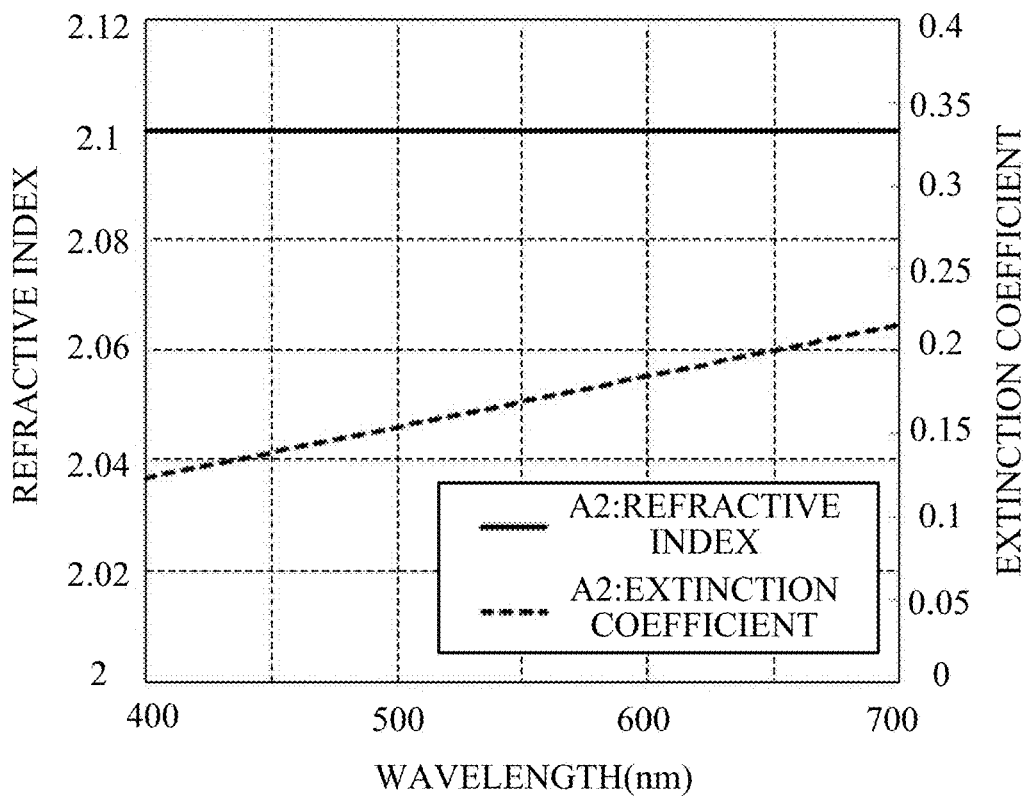
FIG. 23 illustrates a refractive index and an extinction coefficient of the absorbing material in the optical element according to Example 7.

The transparent material 1 uses a glass material S2. The glass material S2 is a substantially non-absorbing material. The antireflection layer 2 includes thin films 21, 22 and 23, and the antireflection layer 4 includes thin films 41, 42, 43 and 44. The film material for the thin films 21, 23, 41 and 43 is H2, the film material for the thin films 22 and 42 is M2, and the film material of the thin film 41 is L1. The film materials M2, H2, and L1 are substantially non-absorbing materials. FIG. 22 illustrates the refractive indexes of the glass material S2 and the film materials M2, H2, and L1. The absorption layer 3 includes the thin film 31, which is made of an absorbing material A2. FIG. 23 illustrates the refractive index and extinction coefficient of the absorbing material A2. As illustrated in Table 9, as the thickness of the absorption layer 3 in the optical filter 100 increases, the optical thicknesses of the thin films 23 and 41 in the antireflection layers 2 and 4 decrease.

Figure 24:
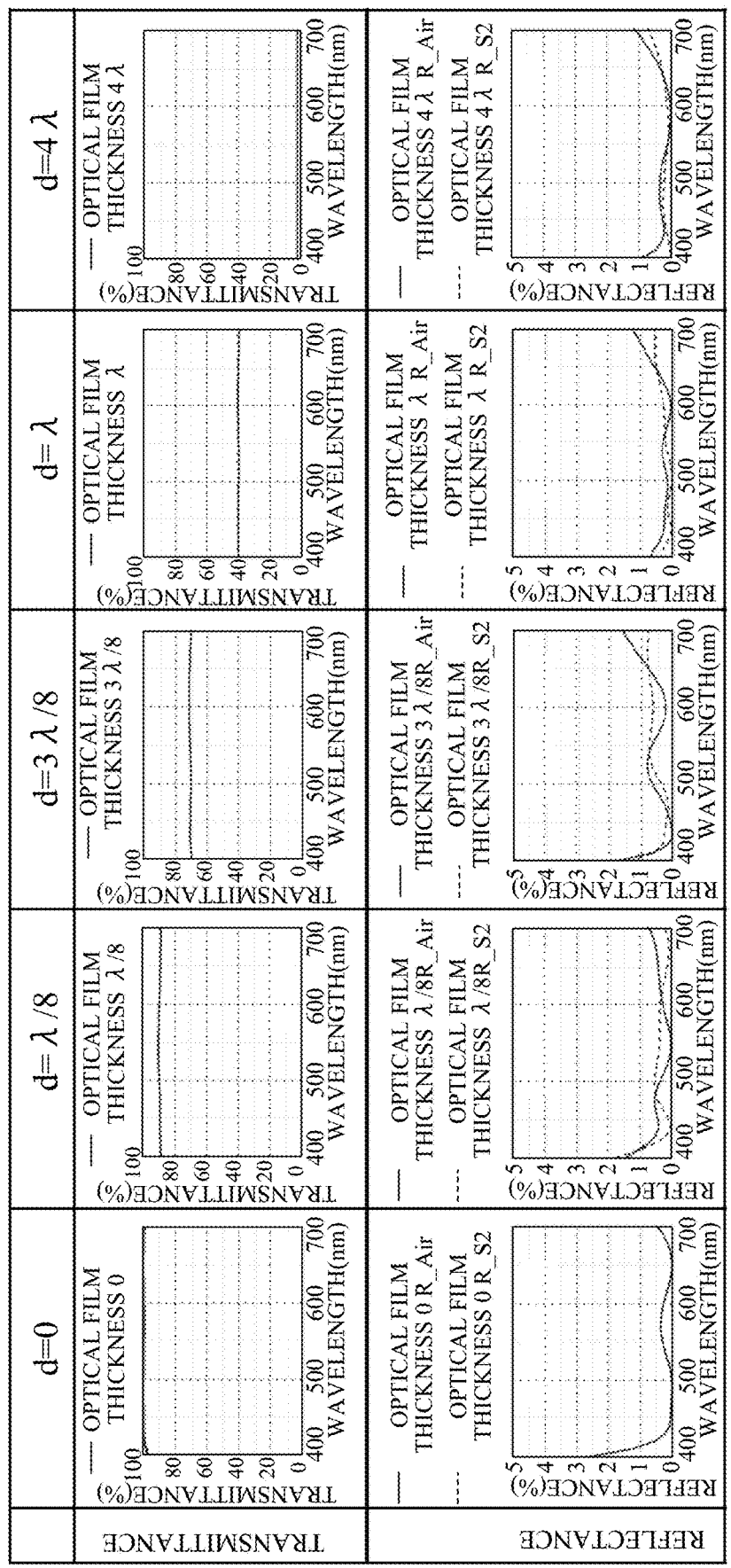
FIG. 24 illustrates spectral transmittances and spectral reflectances of the optical element according to Example 7.

FIG. 24 illustrates the spectral transmittances and the spectral reflectances of the optical filter 100 according to this example. In FIG. 24, R_Air represents the spectral reflectance for the incident light from the air side, and R_S2 represents the spectral reflectance for the incident light from the transparent material S2 side. It is understood from FIG. 24 that when the film thickness d of the thin film 31 is 0, λ/8, 3λ/8, λ, and 4λ, the spectral reflectance is low, and the optical filter 100 according to this example exhibits an excellent antireflection effect.

TABLE 9

| | Material | | Refractive Index (λ = 550 nm) | Optical Film Thickness of Thin Film 31 (nm) (λ = 550 nm)) | | 0 | λ/8 | 3λ/8 | λ | 4λ |
|---|---|---|---|---|---|---|---|---|---|---|
| | | | | | | \multicolumn{5}{c}{Physical Film Thickness (nm)} | | | | |
| Transparent Material 5 | Air | | | | | — | — | — | — | — |
| Surface Antireflection Layer 4 | Thin Film 44 | L1 | 1.38 | Physical Film Thickness (nm) | | 104.68 | 104.68 | 104.68 | 104.68 | 104.68 |
| | | | | $D_x/D_c$(%) | | 100.0 | 100.0 | 100.0 | 100.0 | 100.0 |
| | Thin Film 43 | H2 | 2.25 | Physical Film Thickness (nm) | | 29.42 | 29.42 | 29.42 | 29.42 | 29.42 |
| | | | | $D_x/D_c$(%) | | 100.0 | 100.0 | 100.0 | 100.0 | 100.0 |
| | Thin Film 42 | M2 | 1.60 | Physical Film Thickness (nm) | | 20.47 | 20.47 | 20.47 | 20.47 | 20.47 |
| | | | | $D_x/D_c$(%) | | 100.0 | 100.0 | 100.0 | 100.0 | 100.0 |
| | Thin Film 41 | H2 | 2.25 | Physical Film Thickness (nm) | | 57.91 | 57.74 | 57.45 | 56.89 | 56.12 |
| | | | | $D_x/D_c$(%) | | 100.0 | 99.7 | 99.2 | 98.2 | 96.9 |
| Absorption Layer 3 | Thin Film 31 | A2 | 2.10 | Physical Film Thickness (nm) | | 0.00 | 29.26 | 87.77 | 234.04 | 936.17 |
| Surface Antireflection Layer 2 | Thin Film 23 | H2 | 2.25 | Physical Film Thickness (nm) | | 130.03 | 129.67 | 129.01 | 127.75 | 126.03 |
| | | | | $D_x/D_c$(%) | | 100.0 | 99.7 | 99.2 | 98.2 | 96.9 |
| | Thin Film 22 | M2 | 1.60 | Physical Film Thickness (nm) | | 16.14 | 16.14 | 16.14 | 16.14 | 16.14 |
| | | | | $D_x/D_c$(%) | | 100.0 | 100.0 | 100.0 | 100.0 | 100.0 |
| | Thin Film 21 | H2 | 2.25 | Physical Film Thickness (nm) | | 21.18 | 21.18 | 21.18 | 21.18 | 21.18 |
| | | | | $D_x/D_c$(%) | | 100.0 | 100.0 | 100.0 | 100.0 | 100.0 |
| Transparent Material 1 | Glass Material | S2 | 1.80 | | | — | — | — | — | — |

Example 8

A description will now be given of Example 8 according to the present invention. Similar to Example 5, the optical filter 100 according to this example is a gradation type ND filter in which the transmittance gradually decreases from the optical axis center toward the periphery in the optical plane. The optical filter 100 is sandwiched between the transparent materials 1 and 15. Table 10 shows the film configuration of the optical element 001 including the optical filter 100 according to this example, such as the film thickness of each thin film and $D_x/D_c$ (%) when the thickness of the thin film 31 in the absorption layer 3 is 0, $\lambda/8$, $3\lambda/8$, $\lambda$, and $4\lambda$.

Figure 25:
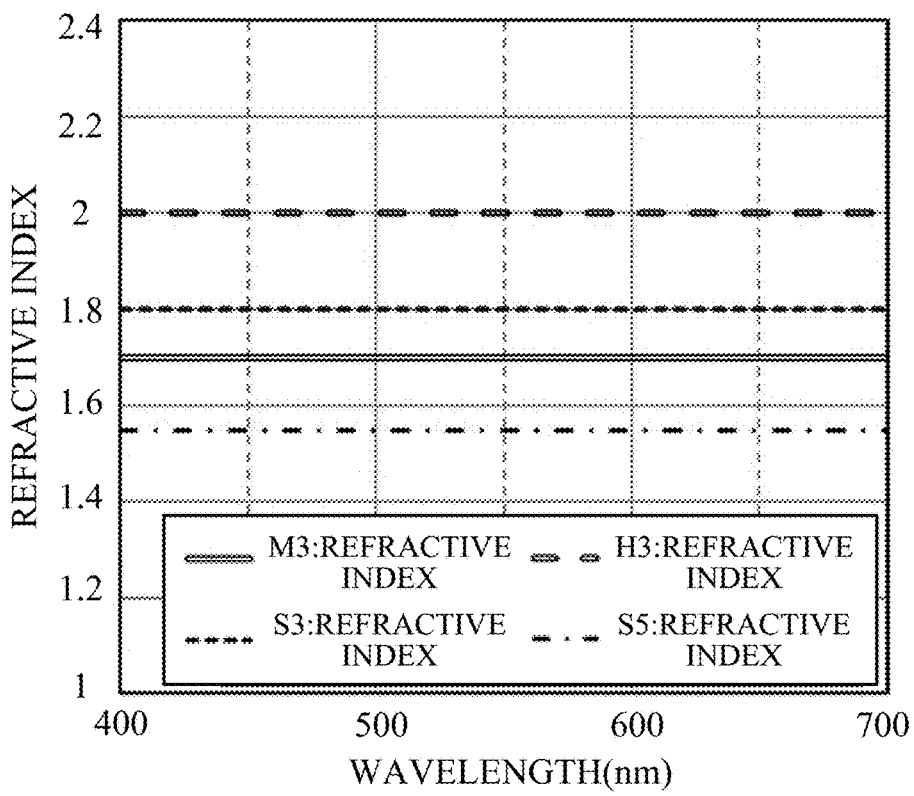
FIG. 25 illustrates a refractive index of each material in an optical element according to Example 8.
Figure 26:
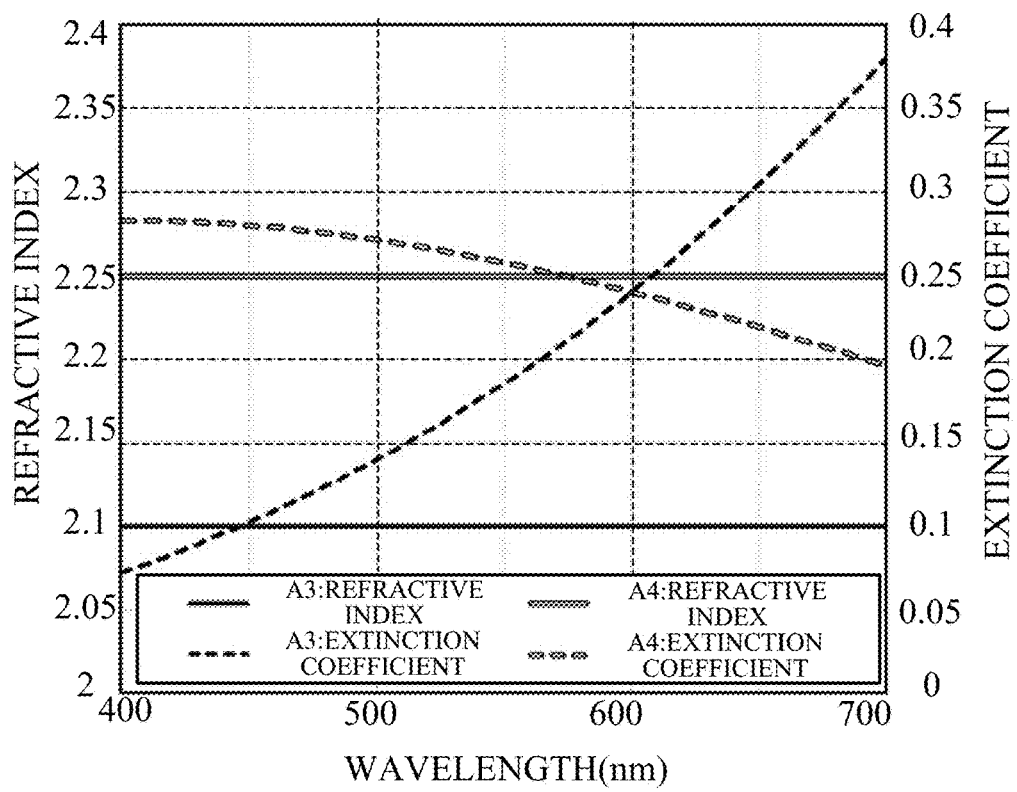
FIG. 26 illustrates a refractive index and an extinction coefficient of the absorbing material in the optical element according to Example 8.

The transparent material 1 uses a glass material S3, and the transparent material 15 is an adhesive S5. The glass material S3 and the adhesive S5 are substantially non-absorbing materials. The antireflection layer 2 includes thin films 21, 22, 23 and 24, and the antireflection layer 4 includes thin films 41 and 42. The film material for the thin films 21, 23, 41 is H3, and the film material for the thin films 22, 24, 42 is M3. The film materials H3 and M3 are substantially non-absorbing materials. FIG. 25 illustrates the refractive indexes of the glass material S3, the adhesive S5, and the film materials H3 and M3. The absorption layer 3 includes two layers or thin films 31 and 32. The thin film 31 is made of an absorbing material A3 and the thin film 32 is made of an absorbing material A4. FIG. 26 illustrates the refractive indexes and extinction coefficients of the absorbing materials A3 and A4. As illustrated in Table 10, as the film thickness of the absorption layer 3 in the optical filter 100 increases, the optical film thicknesses of the thin films 21, 22, 23, 24, 41, and 42 in the antireflection layers 2 and 4 decrease.

Figure 27:
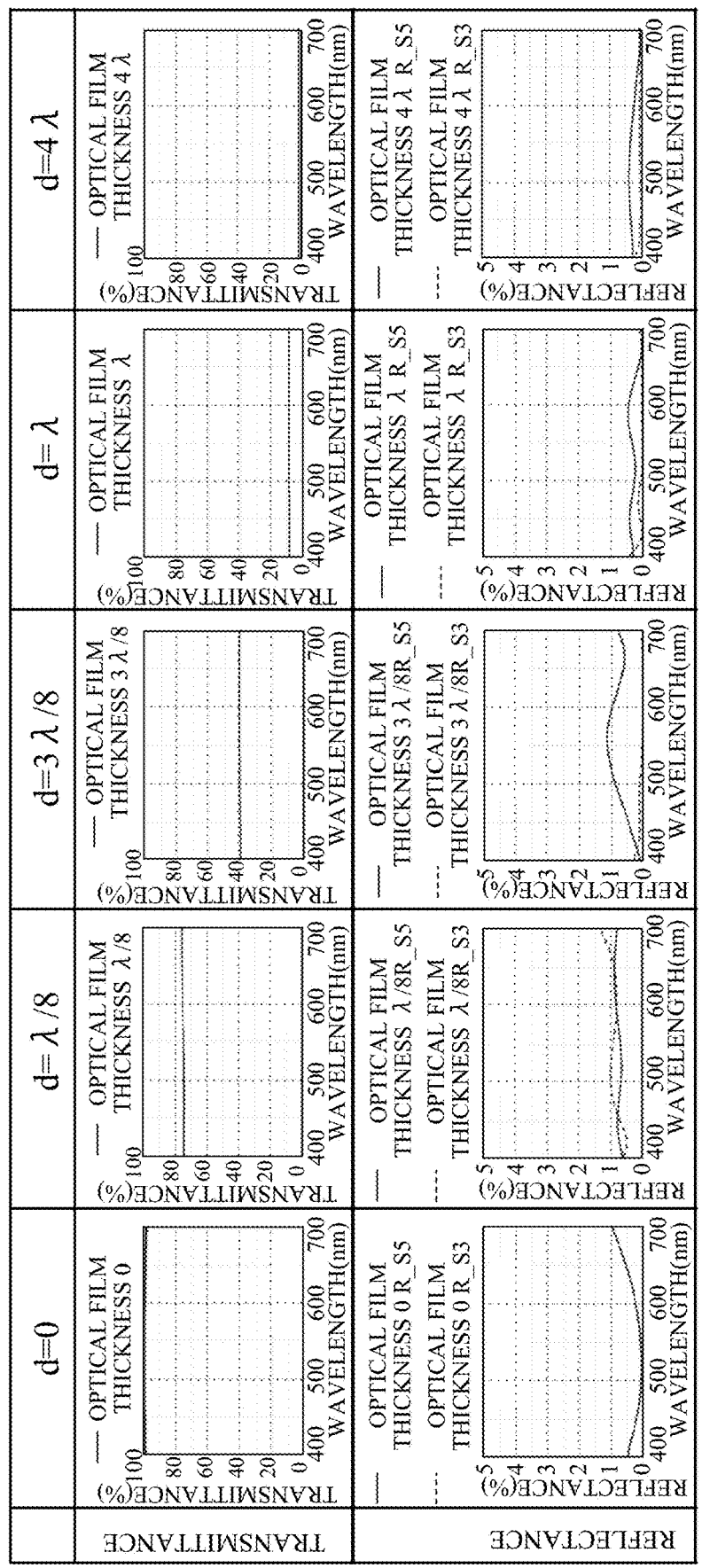
FIG. 27 illustrates spectral transmittances and spectral reflectances of the optical element according to Example 8.

FIG. 27 illustrates the spectral transmittances and the spectral reflectances of the optical filter 100 according to this example. In FIG. 27, R_S5 represents the spectral reflectance for the incident light from the air side, and R_S3 represents the spectral reflectance for the incident light from the transparent material S3 side. It is understood from FIG. 27 that when the film thickness d of the thin film 31 is 0, $\lambda/8$, $3\lambda/8$, $\lambda$, and $4\lambda$, the spectral reflectance is low, and the optical filter 100 according to this example exhibits an excellent antireflection effect.

Example 9

A description will now be given of Example 9 according to the present invention. Similar to Example 5, the optical filter 100 according to this example is a gradation type ND filter in which the transmittance gradually decreases from the optical axis center toward the periphery on the optical plane. The optical filter 100 is formed on the transparent material 1. The transparent material 15 is air. Table 11 shows the film configuration of the optical element 001 including the optical filter 100 according to this example, such as the film thickness of each thin film and $D_x/D_c$ (%) when the film thickness of the thin film 31 in the absorption layer 3 is 0, $\lambda/8$, $3\lambda/8$, $\lambda$, and $4\lambda$.

Figure 28:
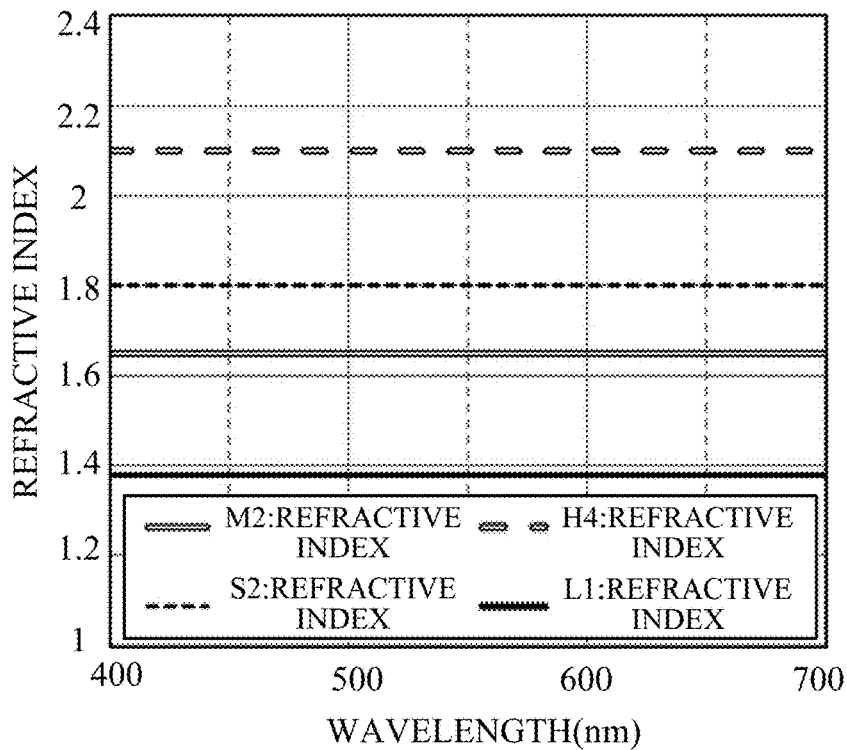
FIG. 28 illustrates a refractive index of each material in an optical element in Example 9.
Figure 29:
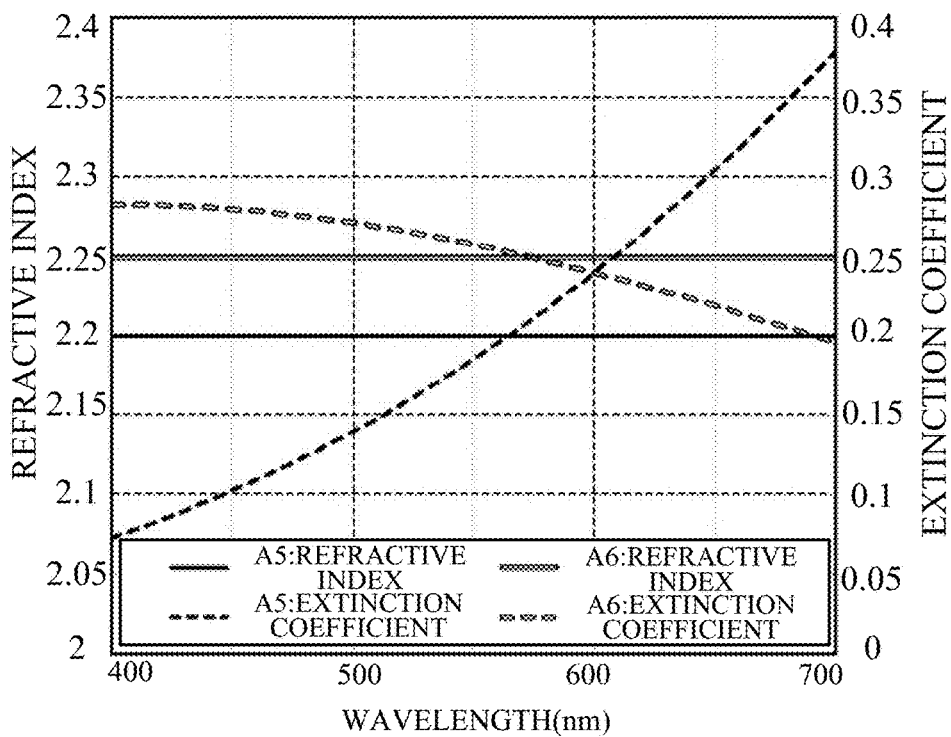
FIG. 29 illustrates a refractive index and an extinction coefficient of the absorbing material in the optical element according to Example 9.

The transparent material 1 uses a glass material S3. The glass material S3 is a substantially non-absorbing material. The antireflection layer 2 includes thin films 21, 22, 23 and 24, and the antireflection layer 4 includes thin films 41, 42 and 43. The film material for the thin films 21, 23, 41 is M2, the film material for the thin films 22, 24, 42 is H4, and the film material for the thin film 43 is L1. The film materials M2, H4, and L1 are substantially non-absorbing materials. FIG. 28 illustrates the refractive indexes of the glass material S3 and the film materials M2, H4, and L1. The absorption layer 3 includes two layers or thin films 31 and 32. The thin film 31 is made of an absorbing material A5 and the thin film 32 is made of an absorbing material A6. FIG. 29 illustrates the refractive indexes and extinction coefficients of the absorbing materials A5 and A6. As shown in Table 11, as the film thickness of the absorption layer 3 of the optical filter 100 increases, the optical film thicknesses of the thin films 21, 22, 23, 24, 41, 42, 43 in the antireflection layers 2 and 4 decrease.

Figure 30:
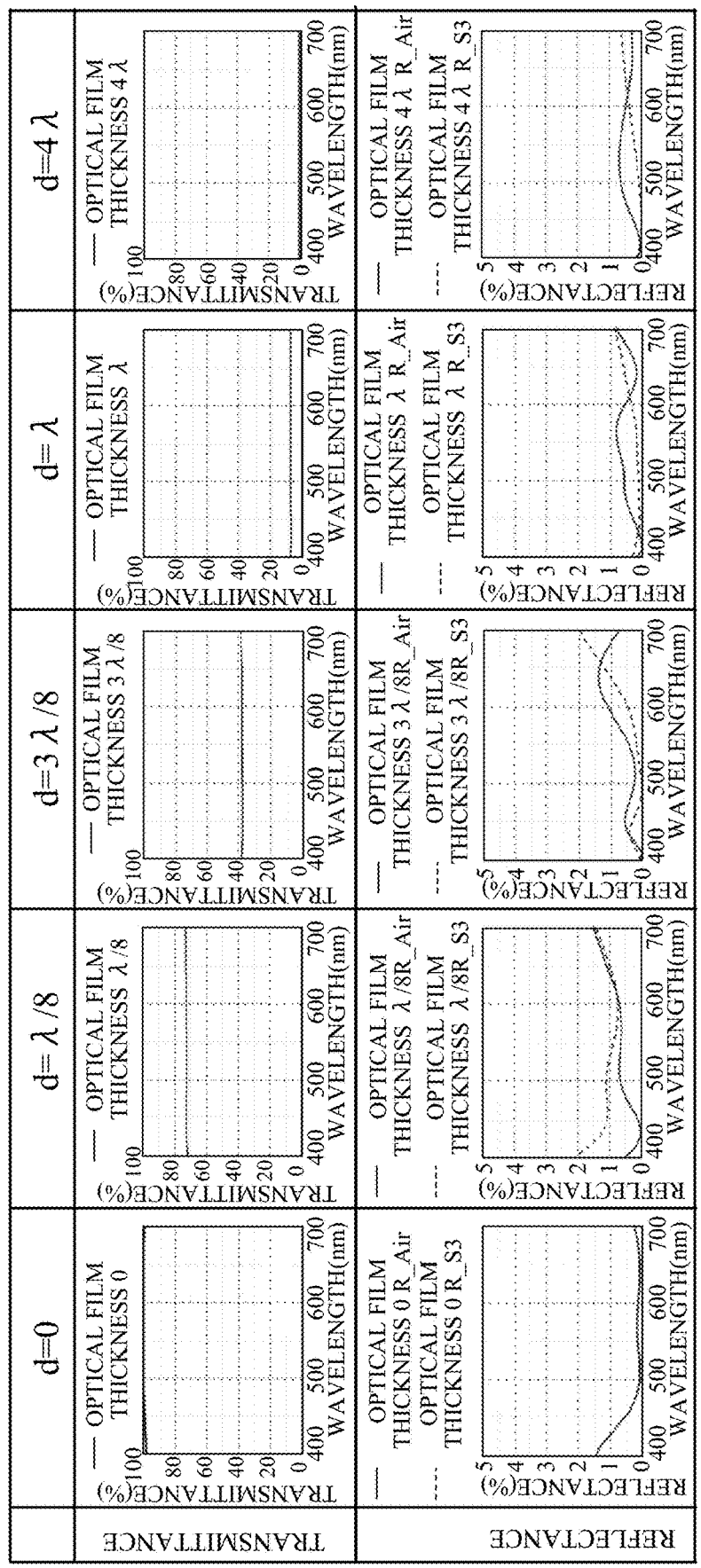
FIG. 30 illustrates spectral transmittances and spectral reflectances of the optical element according to Example 9.

FIG. 30 illustrates the spectral transmittances and spectral reflectances of the optical filter 100 according to this example. In FIG. 30, R_Air represents the spectral reflectance for the incident light from the air side, and R_S3 represents the spectral reflectance for the incident light from the transparent material S3 side. It is understood from FIG. 30 that when the film thickness d of the thin film 31 is 0, $\lambda/8$, $3\lambda/8$, $\lambda$, and $4\lambda$, the spectral reflectance is low, and the optical filter 100 according to this example exhibits an excellent antireflection effect.

TABLE 10

| | | | Refractive Index ($\lambda$ = 550 nm) | Optical Film Thickness of Thin Film 31 (nm) ($\lambda$ = 550 nm) | 0 | $\lambda/8$ | $3\lambda/8$ | $\lambda$ | $4\lambda$ |
|---|---|---|---|---|---|---|---|---|---|
| | | Material | | | Physical Film Thickness (nm) | | | | |
| Transparent Material 5 | Glass Material | S5 | 1.55 | | — | — | — | — | — |
| Surface Antireflection Layer 4 | Thin Film 42 | M3 | 1.70 | Physical Film Thickness (nm) | 71.75 | 71.62 | 71.41 | 71.21 | 71.15 |
| | | | | $D_x/D_c$(%) | 100.0 | 99.8 | 99.5 | 99.2 | 99.2 |
| | Thin Film 41 | H3 | 2.00 | Physical Film Thickness (nm) | 57.96 | 57.85 | 57.68 | 57.52 | 57.47 |
| | | | | $D_x/D_c$(%) | 100.0 | 99.8 | 99.5 | 99.2 | 99.2 |
| Absorption Layer 3 | Thin Film 32 | A4 | 2.25 | Physical Film Thickness (nm) | 0.00 | 29.26 | 87.77 | 234.04 | 936.17 |
| | Thin Film 31 | A3 | 2.10 | Physical Film Thickness (nm) | 0.00 | 29.26 | 87.77 | 234.04 | 936.17 |
| Surface Antireflection Layer 2 | Thin Film 24 | M3 | 1.7 | Physical Film Thickness (nm) | 55.06 | 54.96 | 54.80 | 54.64 | 54.60 |
| | | | | $D_x/D_c$(%) | 100.0 | 99.8 | 99.5 | 99.2 | 99.2 |
| | Thin Film 23 | H3 | 2.00 | Physical Film Thickness (nm) | 38.75 | 38.67 | 38.56 | 38.45 | 38.42 |
| | | | | $D_x/D_c$(%) | 100.0 | 99.8 | 99.5 | 99.2 | 99.2 |
| | Thin Film 22 | M3 | 1.70 | Physical Film Thickness (nm) | 24.02 | 23.98 | 23.91 | 23.84 | 23.82 |
| | | | | $D_x/D_c$(%) | 100.0 | 99.8 | 99.5 | 99.2 | 99.2 |
| | Thin Film 21 | H3 | 2.00 | Physical Film Thickness (nm) | 35.55 | 35.49 | 35.39 | 35.29 | 35.25 |
| | | | | $D_x/D_c$(%) | 100.0 | 99.8 | 99.5 | 99.2 | 99.2 |
| Transparent Material 1 | Glass Material | S3 | 1.90 | | — | — | — | — | — |

TABLE 11

| | Material | Refractive Index ($\lambda$ = 550 nm) | Optical Film Thickness of Thin Film 31 (nm) ($\lambda$ = 550 nm) | | 0 | $\lambda/8$ | $3\lambda/8$ | $\lambda$ | $4\lambda$ |
| --- | --- | --- | --- | --- | --- | --- | --- | --- | --- |
| | | | | | | Physical Film Thickness (nm) | | | |
| Transparent Material 5 | Air | 1.00 | | | — | — | — | — | — |
| Surface Antireflection Layer 4 | Thin Film 43 L1 | 1.38 | Physical Film Thickness (nm) | | 101.62 | 100.86 | 99.76 | 98.69 | 98.39 |
| | | | $D_x/D_c$(%) | | 100.0 | 99.3 | 98.2 | 97.1 | 96.8 |
| | Thin Film 42 H4 | 2.20 | Physical Film Thickness (nm) | | 28.99 | 28.77 | 28.46 | 28.15 | 28.07 |
| | | | $D_x/D_c$(%) | | 100.0 | 99.3 | 98.2 | 97.1 | 96.8 |
| | Thin Film 41 M2 | 1.60 | Physical Film Thickness (nm) | | 17.99 | 17.86 | 17.66 | 17.47 | 17.42 |
| | | | $D_x/D_c$(%) | | 100.0 | 99.3 | 98.2 | 97.1 | 96.8 |
| Absorption Layer 3 | Thin Film 32 A6 | 2.35 | Physical Film Thickness (nm) | | 0.00 | 40.96 | 122.87 | 377.66 | 1310.64 |
| | Thin Film 31 A5 | 2.20 | Physical Film Thickness (nm) | | 0.00 | 29.26 | 87.77 | 234.04 | 936.17 |
| Surface Antireflection Layer 2 | Thin Film 24 H4 | 2.20 | Physical Film Thickness (nm) | | 59.49 | 59.04 | 58.40 | 57.77 | 57.60 |
| | | | $D_x/D_c$(%) | | 100.0 | 99.3 | 98.2 | 97.1 | 96.8 |
| | Thin Film 23 M2 | 1.60 | Physical Film Thickness (nm) | | 18.22 | 18.08 | 17.88 | 17.69 | 17.64 |
| | | | $D_x/D_c$(%) | | 100.0 | 99.3 | 98.2 | 97.1 | 96.8 |
| | Thin Film 22 H4 | 2.20 | Physical Film Thickness (nm) | | 25.06 | 24.87 | 24.60 | 24.34 | 24.26 |
| | | | $D_x/D_c$(%) | | 100.0 | 99.3 | 98.2 | 97.1 | 96.8 |
| | Thin Film 21 M2 | 1.60 | Physical Film Thickness (nm) | | 8.00 | 7.94 | 7.85 | 7.77 | 7.75 |
| | | | $D_x/D_c$(%) | | 100.0 | 99.3 | 98.2 | 97.1 | 96.8 |
| Transparent Material 1 | Glass Material | S2 1.80 | | | — | — | — | — | — |

Example 10

Figure 32:
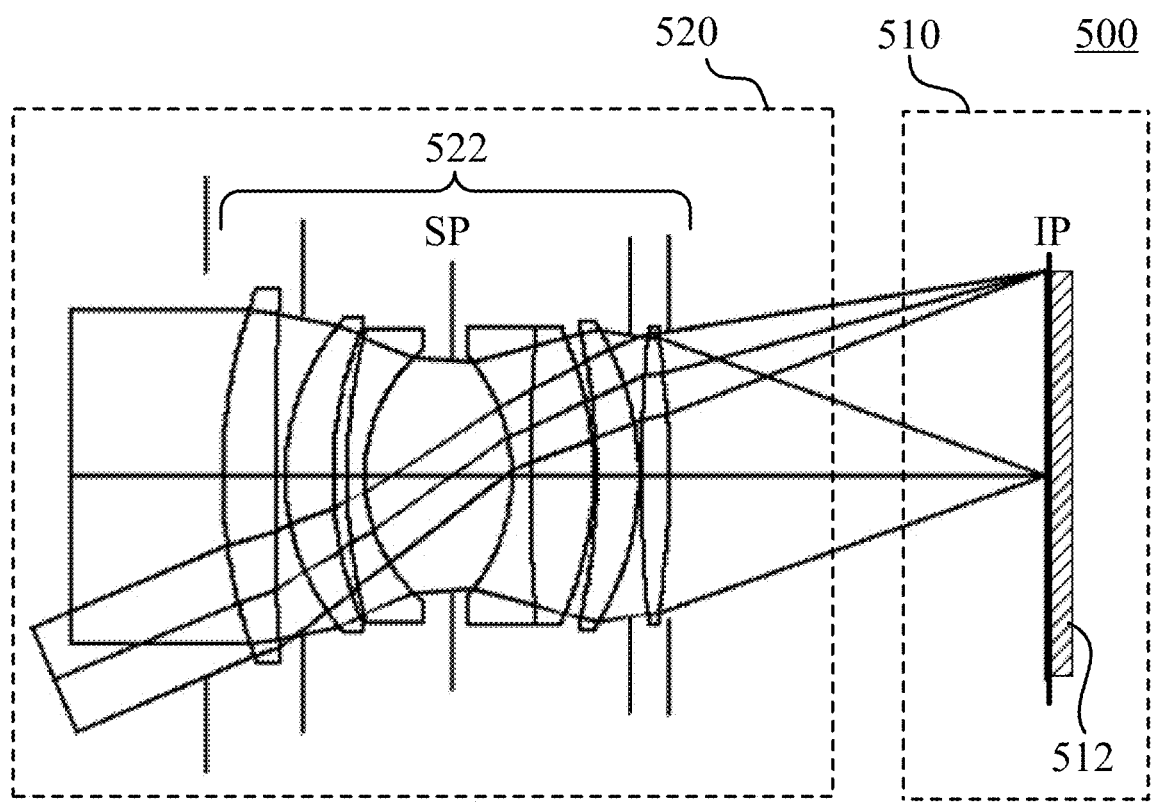
FIG. 32 is a sectional view of the imaging apparatus according to Example 10.

Referring now to FIG. 32, a description will be given of an imaging apparatus 500 according to Example 10. FIG. 32 is a sectional view of the imaging apparatus 500 according to this example. The imaging apparatus 500 includes an imaging apparatus body 510 and a lens apparatus 520 that can be attached to and detached from the imaging apparatus body 510. However, this embodiment is not limited to this example, and is applicable to an imaging apparatus in which an imaging apparatus body and a lens apparatus are integrated with each other. The lens apparatus 520 includes a plurality of optical elements (lens units) 522 and a diaphragm (aperture stop) SP, and constitutes an optical system (imaging optical system). The imaging apparatus body 510 includes an image sensor 512 such as a CMOS sensor. The image sensor 512 is disposed on an imaging plane IP, photoelectrically converts an object image (optical image) formed via an optical system, and outputs image data.

The object image is transmitted through the optical system and formed on the imaging plane IP. In this embodiment, the optical filter (gradation type ND filter) of any one of Examples 1 to 10 is provided on at least one of the diaphragm SP or the lens surfaces before and after the diaphragm SP. However, this embodiment is not limited to this example, and the optical filter may be provided on another lens surface in the optical system.

The optical system illustrated in FIG. 32 is a coaxial and rotationally symmetric optical system. Such an optical system may use an optical filter having a concentric transmittance distribution illustrated in FIG. 1A or 13A. As illustrated in FIGS. 1A-1C, 4A-4C, 10A-10C, or 13A-13B, if an area where the thickness of the absorption layer is 0 is provided at the center part of the optical filter, a transmittance decrease caused by the optical filter can be advantageously suppressed. When the imaging apparatus 500 has a phase difference detection type autofocusing mechanism (AF mechanism), an area where the thickness of the absorption layer is zero or constant may be provided to the central area so as not to change the transmittance of the light beam used for the phase difference detection.

A gradation type ND filter that satisfies $T(r1) \geq T(r2)$ where $T(r1)$ and $T(r2)$ are transmittances at distances r1 and r2 (r1<r2) from the center of the optical surface can provide a high-quality blurred image due to the apodization effect. The gradation type ND filter according to each example when disposed before and after the diaphragm SP can effectively provide the apodization effect even for off-axis light beams, and a high-quality image over the entire image. On the other hand, a gradation type ND filter having such a characteristic as $T(r1) \leq T(r2)$ can correct the peripheral light attenuation of the image or to provide a blurred image that highlights the peripheral part.

When a normal optical filter is disposed at such a position, the reflected light usually becomes stray light and causes ghosts and flares. On the other hand, the gradation type ND filter according to each example can provide a high-quality image that reduces the ghosts and flares for light from both the image side and the object side, since it can maintain the transmittance distribution while reducing the reflectance. The sectional view illustrated in FIG. 32 is merely illustrative, and the optical filter according to each example not limited to a lens in one imaging optical system, and is applicable to a wide variety of optical systems.

Examples 1 to 10 can provide an optical element, an optical system, and an optical apparatus, each of which is easy to manufacture and have high antireflection performance for areas having different transmittances.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-024138, filed on Feb. 14, 2019, and 2019-022449, filed on Feb. 12, 2019, each of which is hereby incorporated by reference herein in their entirety.

What is claimed is:

1. An optical element having an area in which a transmittance changes in a first direction, the optical element comprising a substrate and a first layer arranged in a second direction orthogonal to the first direction,
wherein a thickness of the first layer in the second direction changes in the first direction, and the extinction coefficient of the first layer changes in the first direction, and wherein the following conditional expression is satisfied:

$$0.005 \leq k\text{max} \leq 2.0$$

where kmax is a maximum value of the extinction coefficient for light with a wavelength of 550 nm.

2. The optical element according to claim 1, wherein the following conditional expression is satisfied:

$$k\text{min}/k\text{max} \leq 0.95$$

where kmin is a minimum value of the extinction coefficient.

3. The optical element according to claim 1, wherein the optical element further includes a first area in which the transmittance changes, and a second area in which the transmittance is constant, and
    wherein the first layer is formed in the first area and is not formed in the second area.

4. The optical element according to claim 1, wherein the first layer includes at least two films.

5. The optical element according to claim 1, wherein the first direction is an in-plane direction of the substrate, and the second direction is a direction orthogonal to the in-plane direction.

6. The optical element according to claim 1, wherein the thickness of the first layer changes concentrically in the first direction,
    wherein the thickness is the first thickness in an area in which a distance from a center of the first layer in the first direction is a first distance, and the thickness is a second thickness larger than the first thickness in an area in which the distance is a second distance that is longer than the first distance.

7. The optical element according to claim 6, wherein the extinction coefficient is a first extinction coefficient in an area in which the thickness of the first layer is a third thickness, and the extinction coefficient is a second extinction coefficient higher than the first extinction coefficient in an area in which the thickness of the first layer is a fourth thickness larger than the third thickness.

8. The optical element according to claim 7, wherein the substrate has a circular shape when viewed from the second direction, and
    wherein the extinction coefficient is a third extinction coefficient in an area in which a distance from the center of the first layer in the first direction is a third distance, and the extinction coefficient is a fourth extinction coefficient higher than the third extinction coefficient in an area where the distance is a fourth distance longer than the first distance.

9. The optical element according to claim 1, wherein the substrate has a concave surface opposite to the first layer, and the substrate has a meniscus shape or a biconcave shape.

10. The optical element according to claim 1, wherein the following conditional expression is satisfied:

$$0.1 \leq |OPD1/\lambda| \leq 10$$

where $\lambda$ is the wavelength, and OPD1 is an optical path length difference of the first layer between the thinnest position of the first layer and the thickest position of the first layer.

11. The optical element according to claim 1, wherein the following conditional expressions are satisfied:

$$0.3 < OD\text{max} < 8 \text{ and}$$

$$0.02 \leq |dOD/d\text{max}| \leq 0.8$$

where Odmax is a maximum value of an optical density due to a light absorption in the first layer, dOD is a film thickness of the first layer when the optical density is 0.1, and dmax is a film thickness of the first layer when the optical density is maximum.

12. The optical element according to claim 1, wherein the following conditional expression is satisfied $$-8 \leq \text{Log}(T\text{min}/T\text{max}) \leq -0.4$$

where Tmax is a maximum value of a transmittance due to a light absorption in the first layer and Tmin is a minimum value of the transmittance.

13. The optical element according to claim 1, further comprising a first antireflection layer including a plurality of thin films,
    wherein at least two of the plurality of thin films have at least part of a range in which a thickness increases in a direction opposite to a thickness increasing direction of the first layer.

14. The optical element according to claim 13, further comprising a second antireflection layer on an opposite side of the first antireflection layer with respect to the first layer.

15. The optical element according to claim 14, wherein the optical element includes, in order from the substrate in the second direction, the first antireflection layer, the first layer, and the second antireflection layer, and
    wherein the following conditional expressions are satisfied:

$$0.85 \leq Dx_1/Dc_1 \leq 0.998 \text{ and}$$

$$0.85 \leq Dx_2/Dc_2 \leq 0.998$$

where $Dc_1$ is a maximum optical film thickness of the first antireflection layer, $Dc_2$ is a maximum optical film thickness of the second antireflection layer, and, $Dx_1$ is a total optical film thickness of the first antireflection layer at a position x in a range of an optical film thickness d of the first layer is $\lambda/8 \leq d \leq 3\lambda/8$ (where $\lambda$ is 550 nm), and $Dx_2$ is a total optical film thickness of the second antireflection layer at the position x.

16. The optical element according to claim 15, wherein the following conditional expression is satisfied:

$$0.95 \leq (Dx_1/Dc_1)/(Dx_2/Dc_2) \leq 1.05.$$

17. The optical element according to claim 16, further comprising a first antireflection layer and a second antireflection layer on an opposite side of the first antireflection layer with respect to the first layer,
    wherein each of the first antireflection layer and the second antireflection layer has at least part of a range in which a thickness increases in a direction opposite to a thickness increasing direction of the first layer.

18. An optical system comprising a plurality of optical elements that includes an optical element having an area in which a transmittance changes in a first direction, the optical element comprising a substrate and a first layer arranged in a second direction orthogonal to the first direction,
    wherein a thickness of the first layer in the second direction changes in the first direction, and the extinction coefficient of the first layer changes in the first direction, and
    wherein the following conditional expression is satisfied:

$$0.005 \leq k\text{max} \leq 2.0$$

where kmax is a maximum value of the extinction coefficient for light with a wavelength of 550 nm.

19. An imaging apparatus comprising:
    an optical system having a plurality of optical elements; and an image sensor configured to photoelectrically convert an optical image formed through the optical system and to output image data, wherein the plurality of optical elements includes an optical element having an area in which a transmittance changes in a first direction, the optical element comprising a substrate and a first layer arranged in a second direction orthogonal to the first direction, wherein a thickness of the first layer in the second direction changes in the first direction, and the extinction coefficient of the first layer changes in the first direction, and wherein the following conditional expression is satisfied:

$0.005 \leq k\mathrm{max} \leq 2.0$ where kmax is a maximum value of the extinction coefficient for light with a wavelength of 550 nm.

* * * * *